(12) United States Patent
Fruchey et al.

(10) Patent No.: US 10,287,516 B2
(45) Date of Patent: *May 14, 2019

(54) BLOCK PROCESSING CONFIGURATIONS FOR BASE STOCK PRODUCTION FROM DEASPHALTED OIL

(71) Applicant: ExxonMobil Research and Engineering Company, Annandale, NJ (US)

(72) Inventors: Kendall S. Fruchey, Easton, PA (US); Michael B. Carroll, Center Valley, PA (US); Timothy L. Hilbert, Middleburg, VA (US); Adrienne R. Diebold, Lebanon, NJ (US); Lisa I-Ching Yeh, Marlton, NJ (US); Camden N. Henderson, Mullica Hill, NJ (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/631,620

(22) Filed: Jun. 23, 2017

(65) Prior Publication Data

US 2018/0187089 A1    Jul. 5, 2018

Related U.S. Application Data

(60) Provisional application No. 62/439,943, filed on Dec. 29, 2016.

(51) Int. Cl.
*C10G 65/12* (2006.01)
*C10M 101/02* (2006.01)
(Continued)

(52) U.S. Cl.
CPC .............. *C10G 65/12* (2013.01); *B01J 23/74* (2013.01); *B01L 3/10* (2013.01); *B01L 3/14* (2013.01);
(Continued)

(58) Field of Classification Search
CPC ........ C10G 65/12; C10G 65/00; C10G 67/00; C10G 2300/1077; C10G 2400/10;
(Continued)

(56) References Cited

U.S. PATENT DOCUMENTS 3,414,506 A    12/1968  Van Lookeren Campagne
4,857,220 A *   8/1989  Hashimoto ........ C10M 169/044
                                              508/507

(Continued)

FOREIGN PATENT DOCUMENTS

KR    20030073026 A    9/2003
WO    2014/175952 A1   10/2014

OTHER PUBLICATIONS

The International Search Report and Written Opinion of PCT/US2017/039006 dated Aug. 30, 2017.
(Continued)

*Primary Examiner* — Pamela H Weiss
(74) *Attorney, Agent, or Firm* — Scott F. Yarnell

(57) ABSTRACT

Systems and methods are provided for block operation during lubricant and/or fuels production from deasphalted oil. During "block" operation, a deasphalted oil and/or the hydroprocessed effluent from an initial processing stage can be split into a plurality of fractions. The fractions can correspond, for example, to feed fractions suitable for forming a light neutral fraction, a heavy neutral fraction, and a bright stock fraction, or the plurality of fractions can correspond to any other convenient split into separate fractions. The plurality of separate fractions can then be processed
(Continued)

separately in the process train (or in the sweet portion of the process train) for forming fuels and/or lubricant base stocks. The separate processing can allow for selection of conditions for forming lubricant fractions, such as bright stock fractions, that have a cloud point that is lower than the pour point.

9 Claims, 3 Drawing Sheets

(51) Int. Cl.
| | |
|---|---|
| B01J 23/74 | (2006.01) |
| C10C 3/06 | (2006.01) |
| B01D 3/10 | (2006.01) |
| C10M 175/00 | (2006.01) |
| C10M 171/02 | (2006.01) |
| C10G 67/04 | (2006.01) |
| B01L 3/10 | (2006.01) |
| C10C 3/08 | (2006.01) |
| C10G 1/08 | (2006.01) |
| B01L 3/14 | (2006.01) |
| C10G 21/14 | (2006.01) |
| C10G 45/38 | (2006.01) |
| C10G 65/00 | (2006.01) |
| C10G 67/00 | (2006.01) |
| B01D 3/16 | (2006.01) |
| C08L 95/00 | (2006.01) |

(52) U.S. Cl.
CPC .................. *C10C 3/06* (2013.01); *C10C 3/08* (2013.01); *C10G 1/086* (2013.01); *C10G 21/14* (2013.01); *C10G 45/38* (2013.01); *C10G 65/00* (2013.01); *C10G 67/00* (2013.01); *C10G 67/0454* (2013.01); *C10M 101/02* (2013.01); *C10M 171/02* (2013.01); *C10M 175/0033* (2013.01); *B01D 3/16* (2013.01); *C08L 95/00* (2013.01); *C10G 2300/10* (2013.01); *C10G 2300/1062* (2013.01); *C10G 2300/1077* (2013.01); *C10G 2400/08* (2013.01); *C10G 2400/10* (2013.01); *C10M 2201/06* (2013.01); *C10M 2201/062* (2013.01); *C10M 2203/1006* (2013.01); *C10M 2203/1065* (2013.01); *C10M 2207/10* (2013.01); *C10N 2220/022* (2013.01); *C10N 2220/023* (2013.01); *C10N 2220/032* (2013.01); *C10N 2230/02* (2013.01); *C10N 2230/20* (2013.01); *C10N 2240/10* (2013.01); *C10N 2270/00* (2013.01)

(58) Field of Classification Search
CPC ........ C10G 2300/1062; C10G 2400/08; C10G 2300/10; C10G 67/0454; C10G 1/086; C10G 45/38; C10G 21/14; B01J 23/74; C10C 3/06; C10C 3/08; B01D 3/16; B01D 3/10; B01D 3/14; C10M 2201/062; C10M 2203/1006; C10M 2207/10; C10M 2201/06; C10M 175/0033; C10M 101/02; C10M 171/02; C10M 2203/1065; C10N 2230/02; C10N 2220/032; C10N 2220/023; C10N 2220/022; C10N 2270/00; C10N 2230/20; C10N 2240/10; C08L 95/00

See application file for complete search history.

(56) References Cited

U.S. PATENT DOCUMENTS

| | | | |
|---|---|---|---|
| 5,021,142 | A | 6/1991 | Bortz et al. |
| 7,704,930 | B2 | 4/2010 | Deckman et al. |
| 7,776,206 | B2 | 8/2010 | Miller et al. |
| 7,998,340 | B2 * | 8/2011 | Wedlock .................. C08K 5/01 208/19 |
| 8,101,809 | B2 * | 1/2012 | Elomari ................. C10G 50/02 585/1 |
| 8,604,258 | B2 * | 12/2013 | Elomari ............... C10M 107/06 585/1 |
| 9,418,828 | B2 | 8/2016 | Mennito et al. |
| 2007/0175974 | A1 | 8/2007 | Duininck et al. |
| 2007/0197405 | A1 | 8/2007 | Holmes et al. |
| 2009/0111936 | A1 | 4/2009 | Wedlock |
| 2009/0186786 | A1 * | 7/2009 | Poirier ................. C10M 145/14 508/287 |
| 2011/0083995 | A1 * | 4/2011 | Gleeson ............... C10G 73/025 208/38 |
| 2013/0190544 | A1 | 7/2013 | Wang et al. |
| 2015/0060329 | A1 | 3/2015 | Wedlock |
| 2016/0194566 | A1 | 7/2016 | Hoo et al. |
| 2017/0283729 | A1 | 10/2017 | Pathare et al. |

OTHER PUBLICATIONS

The International Search Report and Written Opinion of PCT/US2017/039027 dated Sep. 8, 2017.
The International Search Report and Written Opinion of PCT/US2017/039021 dated Nov. 3, 2017.
The International Search Report and Written Opinion of PCT/US2017/039012 dated Sep. 5, 2017.

* cited by examiner

BLOCK PROCESSING CONFIGURATIONS FOR BASE STOCK PRODUCTION FROM DEASPHALTED OIL

CROSS REFERENCE TO RELATED APPLICATIONS

This application claims priority to U.S. Provisional Application Ser. No. 62/439,943 filed Dec. 29, 2016, which is herein incorporated by reference in its entirety.

This application is related to three other co-pending U.S. applications, Ser. No. 15/631,675 entitled "Block Processing For Base Stock Production From Deasphalted Oil"; Ser. No. 15/631,540 entitled "Block Processing With Bulk Catalsyts For Base Stock Production From Deasphalted Oil" and Ser. No. 15/631,644 entitled "Base Stocks And Lubricant Compositions Containing Same". Each of these co-pending U.S. applications is hereby incorporated by reference herein in its entirety.

FIELD

Systems and methods are provided for production of lubricant oil base stocks from deasphalted oils produced by low severity deasphalting of resid fractions.

BACKGROUND

Lubricant base stocks are one of the higher value products that can be generated from a crude oil or crude oil fraction. The ability to generate lubricant base stocks of a desired quality is often constrained by the availability of a suitable feedstock. For example, most conventional processes for lubricant base stock production involve starting with a crude fraction that has not been previously processed under severe conditions, such as a virgin gas oil fraction from a crude with moderate to low levels of initial sulfur content.

In some situations, a deasphalted oil formed by propane desaphalting of a vacuum resid can be used for additional lubricant base stock production. Deasphalted oils can potentially be suitable for production of heavier base stocks, such as bright stocks. However, the severity of propane deasphalting required in order to make a suitable feed for lubricant base stock production typically results in a yield of only about 30 wt % deasphalted oil relative to the vacuum resid feed.

U.S. Pat. No. 3,414,506 describes methods for making lubricating oils by hydrotreating pentane-alcohol-deasphalted short residue. The methods include performing deasphalting on a vacuum resid fraction with a deasphalting solvent comprising a mixture of an alkane, such as pentane, and one or more short chain alcohols, such as methanol and isopropyl alcohol. The deasphalted oil is then hydrotreated, followed by solvent extraction to perform sufficient VI uplift to form lubricating oils.

U.S. Pat. No. 7,776,206 describes methods for catalytically processing resids and/or deasphalted oils to form bright stock. A resid-derived stream, such as a deasphalted oil, is hydroprocessed to reduce the sulfur content to less than 1 wt % and reduce the nitrogen content to less than 0.5 wt %. The hydroprocessed stream is then fractionated to form a heavier fraction and a lighter fraction at a cut point between 1150° F.-1300° F. (620° C.-705° C.). The lighter fraction is then catalytically processed in various manners to form a bright stock.

SUMMARY

In various aspects, systems and methods are provided for block operation during lubricant and/or fuels production from deasphalted oil, such as deasphalted oil from a solvent deasphalting process with a yield of deasphalted oil of at least 50 wt %. During "block" operation, a deaspahlted oil and/or the hydroprocessed effluent from an initial processing stage can be split into a plurality of fractions. The fractions can correspond, for example, to feed fractions suitable for forming a light neutral fraction, a heavy neutral fraction, and a bright stock fraction, or the plurality of fractions can correspond to any other convenient split into separate fractions. The plurality of separate fractions can then be processed separately in the process train (or in the sweet portion of the process train) for forming fuels and/or lubricant base stocks. The separate processing can allow for selection of conditions for forming lubricant fractions, such as bright stock fractions, that have a cloud point that is lower than the pour point.

DETAILED DESCRIPTION

Figure 1:
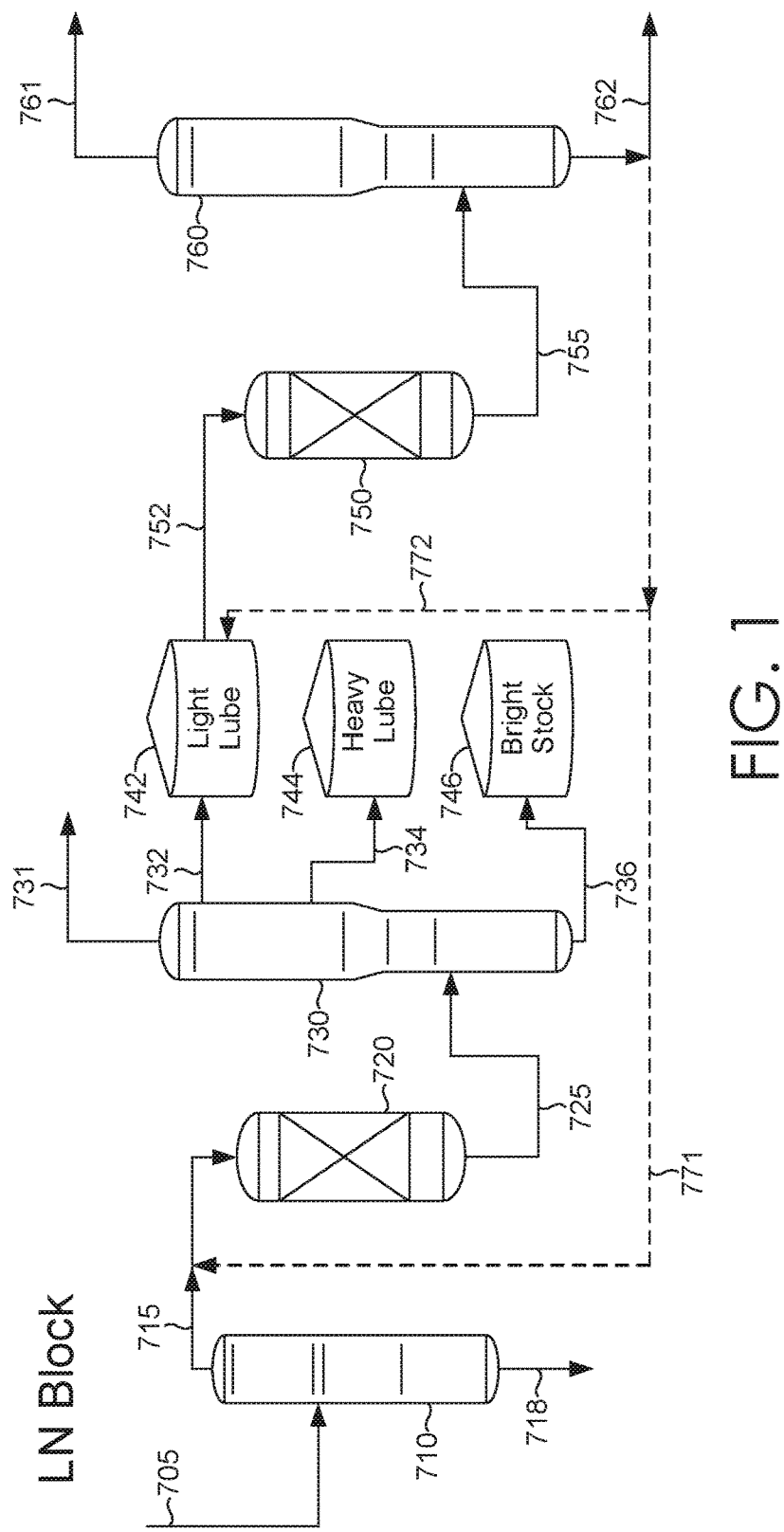
FIG. 1 schematically shows an example of a configuration for block catalytic processing of deasphalted oil to form lubricant base stocks.

All numerical values within the detailed description and the claims herein are modified by "about" or "approximately" the indicated value, and take into account experimental error and variations that would be expected by a person having ordinary skill in the art.

Overview

In various aspects, methods are provided for producing Group I and Group II lubricant base stocks, including Group I and Group II bright stock, from deasphalted oils generated by low severity $C_{4+}$ deasphalting. Low severity deasphalting as used herein refers to deasphalting under conditions that result in a high yield of deasphalted oil (and/or a reduced amount of rejected asphalt or rock), such as a deasphalted oil yield of at least 50 wt % relative to the feed to deasphalting, or at least 55 wt %, or at least 60 wt %, or at least 65 wt %, or at least 70 wt %, or at least 75 wt %. The Group I base stocks (including bright stock) can be formed without performing a solvent extraction on the deasphalted oil. The Group II base stocks (including bright stock) can be formed using a combination of catalytic and solvent processing. In contrast with conventional bright stock produced from deasphalted oil formed at low severity conditions, the Group I and Group II bright stock described herein can be substantially free from haze after storage for extended periods of time. This haze free Group II bright stock can correspond to a bright stock with an unexpected composition.

In various additional aspects, methods are provided for catalytic processing of $C_{4+}$ deasphalted oils to form Group II bright stock. Forming Group II bright stock by catalytic processing can provide a bright stock with unexpected compositional properties. An example of such an unexpected property is a bright stock with a cloud point that is lower than the pour point. Conventionally, it is expected that the cloud point for a base stock should correspond to a higher temperature than the pour point. The cloud point can typically correspond to the temperature related to the onset of crystallization. It has been unexpectedly discovered that catalytically processed bright stock can have a pour point that is based on the temperature at which the viscosity of the fluid phase becomes too high for effective flow. While such an increase in viscosity may or may not indicate a liquid-to-glass phase transition, such a transition is not related to the onset of crystallization that is usually associated with a cloud point. This is in contrast to conventional base stocks, where the pour point corresponds to a continuation of the crystallization and/or liquid-to-solid phase transition. Such a base stock can have a turbidity of 5 NTUs or less, or 3 NTUs or less, or 2 NTUs or les.

Conventionally, crude oils are often described as being composed of a variety of boiling ranges. Lower boiling range compounds in a crude oil correspond to naphtha or kerosene fuels. Intermediate boiling range distillate compounds can be used as diesel fuel or as lubricant base stocks. If any higher boiling range compounds are present in a crude oil, such compounds are considered as residual or "resid" compounds, corresponding to the portion of a crude oil that is left over after performing atmospheric and/or vacuum distillation on the crude oil.

In some conventional processing schemes, a resid fraction can be deasphalted, with the deasphalted oil used as part of a feed for forming lubricant base stocks. In conventional processing schemes a deasphalted oil used as feed for forming lubricant base stocks is produced using propane deasphalting. This propane deasphalting corresponds to a "high severity" deasphalting, as indicated by a typical yield of deasphalted oil of about 40 wt % or less, often 30 wt % or less, relative to the initial resid fraction. In a typical lubricant base stock production process, the deasphalted oil can then be solvent extracted to reduce the aromatics content, followed by solvent dewaxing to form a base stock. The low yield of deasphalted oil is based in part on the inability of conventional methods to produce lubricant base stocks from lower severity deasphalting that do not form haze over time.

In some aspects, it has been discovered that using a mixture of catalytic processing, such as hydrotreatment, and optionally solvent processing (for the bright stock), such as solvent dewaxing, can be used to produce lubricant base stocks from deasphalted oil while also producing base stocks that have little or no tendency to form haze over extended periods of time. The deasphalted oil can be produced by deasphalting process that uses a $C_4$ solvent, a $C_5$ solvent, a $C_{6+}$ solvent, a mixture of two or more $C_{4+}$ solvents, or a mixture of two or more $C_{5+}$ solvents. The deasphalting process can further correspond to a process with a yield of deasphalted oil of at least 50 wt % for a vacuum resid feed having a T10 distillation point (or optionally a T5 distillation point) of at least 510° C., or a yield of at least 60 wt %, or at least 65 wt %, or at least 70 wt %. It is believed that the reduced haze formation is due in part to the reduced or minimized differential between the pour point and the cloud point for the base stocks and/or due in part to forming a bright stock with a cloud point of −5° C. or less. The light neutral and heavy neutral base stocks can avoid haze formation without the need for additional solvent processing.

For production of Group I base stocks, a deasphalted oil can be hydroprocessed (hydrotreated and/or hydrocracked) under conditions sufficient to achieve a desired viscosity index increase for resulting base stock products. The hydroprocessed effluent can be fractionated to separate lower boiling portions from a lubricant base stock boiling range portion. The lubricant base stock boiling range portion can then be solvent dewaxed to produce a dewaxed effluent. The dewaxed effluent can be separated to form a plurality of base stocks with a reduced tendency (such as no tendency) to form haze over time.

For production of Group II base stocks, in some aspects a deasphalted oil can be hydroprocessed (hydrotreated and/or hydrocracked), so that ~700° F.+ (370° C.+) conversion is 10 wt % to 40 wt %. The hydroprocessed effluent can be fractionated to separate lower boiling portions from a lubricant base stock boiling range portion. The lubricant boiling range portion can then be hydrocracked, dewaxed, and hydrofinished to produce a catalytically dewaxed effluent. Optionally but preferably, the lubricant boiling range portion can be underdewaxed, so that the wax content of the catalytically dewaxed heavier portion or potential bright stock portion of the effluent is at least 6 wt %, or at least 8 wt %, or at least 10 wt %. This underdewaxing can also be suitable for forming light or medium or heavy neutral lubricant base stocks that do not require further solvent upgrading to form haze free base stocks. In this discussion, the heavier portion/potential bright stock portion can roughly correspond to a 538° C.+ portion of the dewaxed effluent. The catalytically dewaxed heavier portion of the effluent can then be solvent dewaxed to form a solvent dewaxed effluent. The solvent dewaxed effluent can be separated to form a plurality of base stocks with a reduced tendency (such as no tendency) to form haze over time, including at least a portion of a Group II bright stock product.

For production of Group II base stocks, in other aspects a deasphalted oil can be hydroprocessed (hydrotreated and/or hydrocracked), so that 370° C.+ conversion is at least 40 wt %, or at least 50 wt %. The hydroprocessed effluent can be fractionated to separate lower boiling portions from a lubricant base stock boiling range portion. The lubricant base stock boiling range portion can then be hydrocracked, dewaxed, and hydrofinished to produce a catalytically dewaxed effluent. At least a heavier portion of the catalytically dewaxed effluent can then be solvent extracted to form a raffinate. The raffinate can be separated to form base stocks with a reduced tendency (such as no tendency) to form haze over time, including at least a portion of a Group II bright stock product. The lighter portions of the catalytically dewaxed effluent can be used to form light neutral and heavy neutral base stocks without requiring further solvent processing to form a clear and bright (haze-free) product.

In some aspects, it has been discovered that catalytic processing can be used to produce Group II bright stock with unexpected compositional properties from $C_3$, $C_4$, $C_5$, and/or $C_{5+}$ deasphalted oil. The deasphalted oil can be hydrotreated to reduce the content of heteroatoms (such as sulfur and nitrogen), followed by catalytic dewaxing under sweet conditions. Optionally, hydrocracking can be included as part of the sour hydrotreatment stage and/or as part of the sweet dewaxing stage.

Optionally, the systems and methods described herein can be used in "block" operation to allow for additional improvements in yield and/or product quality. During "block" operation, a deaspahlted oil and/or the hydroprocessed effluent from the sour processing stage can be split into a plurality of fractions. The fractions can correspond, for example, to feed fractions suitable for forming a light neutral fraction, a heavy neutral fraction, and a bright stock fraction, or the plurality of fractions can correspond to any other convenient split into separate fractions. The plurality of separate fractions can then be processed separately in the process train (or in the sweet portion of the process train) for forming lubricant base stocks. For example, the light neutral portion of the feed can be processed for a period of time, followed by processing of the heavy neutral portion, followed by processing of a bright stock portion. During the time period when one type of fraction is being processed, storage tanks can be used to hold the remaining fractions.

Block operation can allow the processing conditions in the process train to be tailored to each type of lubricant fraction. For example, the amount of sweet processing stage conversion of the heavy neutral fraction can be lower than the amount of sweet processing stage conversion for the light neutral fraction. This can reflect the fact that heavy neutral lubricant base stocks may not need as high a viscosity index as light neutral base stocks.

Another option for modifying the production of base stocks can be to recycle a portion of at least one lubricant base stock product for further processing in the process train. This can correspond to recycling a portion of a base stock product for further processing in the sour stage and/or recycling a portion of a base stock product for further processing in the corresponding sweet stage. Optionally, a base stock product can be recycled for further processing in a different phase of block operation, such as recycling light neutral base stock product formed during block processing of the heavy neutral fraction for further processing during block processing of the light neutral fraction. The amount of base stock product recycled can correspond to any convenient amount of a base stock product effluent from the fractionator, such as 1 wt % to 50 wt % of a base stock product effluent, or 1 wt % to 20 wt %.

Recycling a portion of a base stock product effluent can optionally be used while operating a lube processing system at higher than typical levels of fuels conversion. When using a conventional feed for lubricant production, conversion of feed relative to 370° C. can be limited to 65 wt % or less. Conversion of more than 65 wt % of a feed relative to 370° C. is typically not favored due to loss of viscosity index with additional conversion. At elevated levels of conversion, the loss of VI with additional conversion is believed to be due to cracking and/or conversion of isoparaffins within a feed. For feeds derived from deasphalted oil, however, the amount of isoparaffins within a feed is lower than a conventional feed. As a result, additional conversion can be performed without loss of VI. In some aspects, converting at least 70 wt % of a feed, or at least 75 wt %, or at least 80 wt % can allow for production of lubricant base stocks with substantially improved cold flow properties while still maintaining the viscosity index of the products at a similar value to the viscosity index at a conventional conversion of 60 wt %.

Group I base stocks or base oils are defined as base stocks with less than 90 wt % saturated molecules and/or at least 0.03 wt % sulfur content. Group I base stocks also have a viscosity index (VI) of at least 80 but less than 120. Group II base stocks or base oils contain at least 90 wt % saturated molecules and less than 0.03 wt % sulfur. Group II base stocks also have a viscosity index of at least 80 but less than 120. Group III base stocks or base oils contain at least 90 wt % saturated molecules and less than 0.03 wt % sulfur, with a viscosity index of at least 120.

In some aspects, a Group III base stock as described herein may correspond to a Group III+ base stock. Although a generally accepted definition is not available, a Group III+ base stock can generally correspond to a base stock that satisfies the requirements for a Group III base stock while also having at least one property that is enhanced relative to a Group III specification. The enhanced property can correspond to, for example, having a viscosity index that is substantially greater than the required specification of 120, such as a Group III base stock having a VI of at least 130, or at least 135, or at least 140. Similarly, in some aspects, a Group II base stock as described herein may correspond to a Group II+ base stock. Although a generally accepted definition is not available, a Group II+ base stock can generally correspond to a base stock that satisfies the requirements for a Group II base stock while also having at least one property that is enhanced relative to a Group II specification. The enhanced property can correspond to, for example, having a viscosity index that is substantially greater than the required specification of 80, such as a Group II base stock having a VI of at least 103, or at least 108, or at least 113.

In the discussion below, a stage can correspond to a single reactor or a plurality of reactors. Optionally, multiple parallel reactors can be used to perform one or more of the processes, or multiple parallel reactors can be used for all processes in a stage. Each stage and/or reactor can include one or more catalyst beds containing hydroprocessing catalyst. Note that a "bed" of catalyst in the discussion below can refer to a partial physical catalyst bed. For example, a catalyst bed within a reactor could be filled partially with a hydrocracking catalyst and partially with a dewaxing catalyst. For convenience in description, even though the two catalysts may be stacked together in a single catalyst bed, the hydrocracking catalyst and dewaxing catalyst can each be referred to conceptually as separate catalyst beds.

In this discussion, conditions may be provided for various types of hydroprocessing of feeds or effluents. Examples of hydroprocessing can include, but are not limited to, one or more of hydrotreating, hydrocracking, catalytic dewaxing, and hydrofinishing/aromatic saturation. Such hydroprocessing conditions can be controlled to have desired values for the conditions (e.g., temperature, pressure, LHSV, treat gas rate) by using at least one controller, such as a plurality of controllers, to control one or more of the hydroprocessing conditions. In some aspects, for a given type of hydroprocessing, at least one controller can be associated with each type of hydroprocessing condition. In some aspects, one or more of the hydroprocessing conditions can be controlled by an associated controller. Examples of structures that can be controlled by a controller can include, but are not limited to, valves that control a flow rate, a pressure, or a combination thereof; heat exchangers and/or heaters that control a temperature; and one or more flow meters and one or more associated valves that control relative flow rates of at least two flows. Such controllers can optionally include a controller feedback loop including at least a processor, a detector for detecting a value of a control variable (e.g., temperature, pressure, flow rate, and a processor output for controlling the value of a manipulated variable (e.g., changing the position of a valve, increasing or decreasing the duty cycle and/or temperature for a heater). Optionally, at least one hydroprocessing condition for a given type of hydroprocessing may not have an associated controller.

In this discussion, unless otherwise specified a lubricant boiling range fraction corresponds to a fraction having an initial boiling point or alternatively a T5 boiling point of at least about 370° C. (~700° F.). A distillate fuel boiling range fraction, such as a diesel product fraction, corresponds to a fraction having a boiling range from about 193° C. (375° F.) to about 370° C. (~700° F.). Thus, distillate fuel boiling range fractions (such as distillate fuel product fractions) can have initial boiling points (or alternatively T5 boiling points) of at least about 193° C. and final boiling points (or alternatively T95 boiling points) of about 370° C. or less. A naphtha boiling range fraction corresponds to a fraction having a boiling range from about 36° C. (122° F.) to about 193° C. (375° F.) to about 370° C. (~700° F.). Thus, naphtha fuel product fractions can have initial boiling points (or alternatively T5 boiling points) of at least about 36° C. and final boiling points (or alternatively T95 boiling points) of about 193° C. or less. It is noted that 36° C. roughly corresponds to a boiling point for the various isomers of a C5 alkane. A fuels boiling range fraction can correspond to a distillate fuel boiling range fraction, a naphtha boiling range fraction, or a fraction that includes both distillate fuel boiling range and naphtha boiling range components. Light ends are defined as products with boiling points below about 36° C., which include various C1-C4 compounds. When determining a boiling point or a boiling range for a feed or product fraction, an appropriate ASTM test method can be used, such as the procedures described in ASTM D2887, D2892, and/or D86. Preferably, ASTM D2887 should be used unless a sample is not appropriate for characterization based on ASTM D2887. For example, for samples that will not completely elute from a chromatographic column, ASTM D7169 can be used.

Process Variations

In various aspects, fixed bed (such as trickle-bed) hydroprocessing systems can be used to perform the various types of hydroprocessing described herein, including demetallization, hydrotreating, hydrocracking, catalytic dewaxing, and/or aromatic saturation. Additionally or alternately, in some aspects, it can be beneficial to perform at least a portion of the sour stage processing in a reactor having a configuration different from a trickle-bed reactor, such as an ebullated bed reactor or a slurry reactor. These alternative configurations can be beneficial, for example, for processing deasphalted oils that may have less desirable properties. For example, some deasphalted oils may have elevated levels of metals and/or micro carbon residue. Use of an alternative reactor configuration in the sour stage can be beneficial for allowing catalyst removal and/or regeneration without stopping operation of the total reaction system. Additionally, the alternative reactor configurations could be beneficial for deasphalted oils that have a Bureau of Mines Correlation Index (BMCI) minus the toluene equivalence (TE) of less than 50 (e.g. BMCI–TE<50). This can happen with low solvency crudes, or if asphaltene entrainment is occurring in the deasphalter. In such an aspect, the alternative reactor configurations can avoid compatibility issues, such as plugging, that could occur in a fixed bed reactor configuration.

One example of a suitable alternative configuration can be to use an ebullated bed reactor to perform at least a portion of the hydroprocessing in the sour stage. For example, one or more ebullated bed reactors can be used to achieve between 30 wt % to 85 wt %% conversion of a deasphalted oil relative to 650° F. (343° C.). The converted fraction can then be separated out, followed by further processing of the 343° C.+ fraction, in a fixed bed reactor including hydrotreating and/or hydrocracking catalyst to achieve a sulfur level of 50 wppm or less and a nitrogen level of 20 wppm or less. This product from the fixed bed reactor, after optional separation to remove fuels boiling range (and lower) components, can then be processed in a sweet processing stage as described herein to form lubricant base stocks (optionally including bright stocks).

Another example of a suitable alternative configuration can be to use a slurry hydroprocessing reactor to perform at least a portion of the hydroprocessing in the sour stage. For example, one or more slurry hydroprocessing reactors can be used to achieve between 50 wt % to 95 wt %% conversion of a deasphalted oil relative to 650° F. (343° C.). The converted fraction can then be separated out, followed by further processing of the 343° C.+ fraction, in a fixed bed reactor including hydrotreating and/or hydrocracking catalyst to achieve a sulfur level of 50 wppm or less and a nitrogen level of 20 wppm or less. This product from the fixed bed reactor, after optional separation to remove fuels boiling range (and lower) components, can then be processed in a sweet processing stage as described herein to form lubricant base stocks (optionally including bright stocks).

Still another option for handling deasphalted oils with elevated contents of metals and/or micro carbon residue can be to perform solvent extraction prior to hydroprocessing in the sour stage, such as solvent extraction using N-methylpyrrolidone. This can in some ways correspond to a second "deasphalting" process, but the extract from the solvent extraction process can have lower contaminant levels than a typical deasphalter rock fraction. Additionally, the extract can have a substantially lower viscosity than a typical deasphalter rock fraction. This can allow the extract to be incorporated into a variety of products or feeds with a reduced or minimized amount of fouling or other difficulties, such as incorporation into asphalt products, feed for fluid catalytic cracking, or feed for coking.

In various aspects, the sweet stage of a reaction system for production of base stocks in block operation can include an optional aromatic saturation catalyst, a hydrocracking catalyst, a dewaxing catalyst, and a second aromatic saturation catalyst. In aspects where the initial optional aromatic saturation catalyst is present, the second aromatic saturation catalyst can be the same or different from the optional aromatic saturation catalyst. This combination of catalysts can allow for additional conversion of the effluent from the sour stage, dewaxing to improve cold flow properties, and additional aromatic saturation to provide base stocks with 95 wt % or more of saturates. In some aspects, it can be beneficial to use an alternative configuration in the sweet stage.

As an example, after conversion of the deasphalted oil in the sour stage, either after separation to remove a 650° F.– (343° C.–) portion of the sour stage effluent or after separation of the 343° C.+ portion sour stage effluent into separate streams for block processing, at least a portion of the sour stage effluent can be solvent dewaxed to remove the wax. This type of configuration can potentially reduce or minimize the cloud point/pour point spread for the resulting base stocks, which for paraffinic crudes may provide better low or no haze performance of the bright stock.

As another example, after conversion of the deasphalted oil in the sour stage, either after separation to remove a 650° F.– (343° C.–) portion of the sour stage effluent or after separation of the 343° C.+ portion sour stage effluent into separate streams for block processing, at least a portion of the sour stage effluent can be processed by exposing the sour stage effluent to a fixed bed of ZSM-5 or another medium pore zeolitic dewaxing catalyst that performs dewaxing primarily by cracking. Optionally, the medium pore dewaxing catalyst can include supported noble metal(s) and/or supported base metal(s). Alternatively, the medium pore dewaxing catalyst can be substantially free of supported catalytic metals. Exposing the sour stage effluent to a medium pore dewaxing catalyst can result in lower lubricant viscosity index, but such a dewaxing catalyst can be more tolerant of sulfur and nitrogen slip in the hydroprocessed deasphalted oil from the sour stage, such as in aspects where the dewaxing catalyst does not include supported metals. This could allow, for example, the sour stage to be operated at a lower severity, with the benefit of greater total lube yields, and a high viscosity for the bright stock.

In various aspects, hydroprocessing of deasphalted oil to form lubricant base stocks can result in formation of a variety of products. In addition to light neutral, heavy neutral, and bright stock products formed by block processing, additional fuels and lubricant products can be formed. The fuels products can include naphtha and diesel fractions formed due to conversion in the sour stage and conversion in the sweet stage. The sour stage fuels products can optionally be processed further, if necessary, in order to satisfy desired standards for sulfur and nitrogen content. The additional lubricant products can include additional light neutral and heavy neutral products that are formed during block processing. For example, sweet stage processing of the heavy neutral block feed can result in some "conversion" of heavy neutral base stock to light neutral base stock. Similarly, sweet stage processing of the bright stock block feed can result in some "conversion" of bright stock to light neutral base stock and/or heavy neutral base stock.

In some aspects, alternative types of products and/or product dispositions can be generated in conjunction with hydroprocessing of a deasphalted oil. For example, various sour stage and/or sweet stage effluents can be suitable for use as a steam cracker feed. Both the sour stage hydrocrackate and the basestock products, particularly the heavy diesel and naphtha, and/or any narrow boiling range fractions that may be distilled in between lube cuts to manage lube properties, can make suitable steam cracker feeds. It could be a single component, a blend of a few components, or the entire sour stage product which may be sent to a steam cracker. Such a steam cracker feed can have 98 wt % or more saturates for the sweet products and 75 wt % or more saturates for the hydrocrackates, which can be beneficial in a steam cracker feed. Additionally, such a feed can be low in sulfur which can reduce or minimize tar formation.

As another example, the bright stock product can be used as an unexpectedly beneficial fluxant for asphalt production. The bright stock is sufficiently heavy to avoid mass loss, has low viscosity, and although the saturates content is relatively high, because it is dewaxed it has very low wax. Wax is a detrimental quality for asphalt, and most low viscosity fluxes for asphalt type streams that are also non-toxic, like vacuum gas oils, have significant quantities of wax. This can make a bright stock made according to the processes described herein a suitable flux for a high asphaltene, high viscosity asphalt blend component, such as deasphalter rock, or deasphalter rock from a high-lift deasphalter.

In various aspects, the sweet stage of the reaction system can include a hydrocracking catalyst followed (downstream) by a dewaxing catalyst followed by an aromatic saturation catalyst. For example, the sweet stage of a reaction system can include a first reactor containing hydrocracking catalyst, a second reactor containing dewaxing catalyst, and a third reactor containing aromatic saturation catalyst. In some aspects, other types of catalyst configurations in the sweet stage can be beneficial.

As an example, the first reactor in the sweet stage can include a hydrocracking catalyst followed by an aromatic saturation catalyst. Including both hydrocracking and aromatic saturation functionality in the initial part of the sweet stage can be beneficial for allowing boiling point conversion and/or viscosity index upgrading that can be tailored for each type of blocked feed. Because this reactor is a sweet processing stage, the temperature can be relatively low, thus allowing effective aromatic saturation (reduced amount of constraint due to equilibrium) while still being able to achieve desired boiling point conversion and/or viscosity index upgrading.

As another example, the initial reactor or portion of the sweet stage can include an aromatic saturation catalyst without the presence of a hydrocracking catalyst. This type of configuration can provide superior yield for basestocks that do not require additional viscosity index upgrade in the sweet stage. Additionally or alternately, at end of run, the lack of a hydrocracking catalyst can allow the sweet stage reactors (or at least the initial reactor) to be operated to be operated at higher temperature to achieve desired aromatic saturation without excessive cracking.

In various aspects, the sour stage of the reaction system can include one or more optional demetallization catalysts followed (downstream) by a hydrotreating catalyst followed by a hydrocracking catalyst. In some aspects, a large pore catalyst, such as a demetallization catalyst, can be included downstream from the hydrocracking catalyst. Such a large pore catalyst downstream from the hydrocracking catalyst can be beneficial due to the differences between a feed corresponding to a high yield deasphalted oil and a conventional feed for lubricant production. During processing of a conventional feed for lubricant production, removal of mercaptans can potentially pose a challenge at the end of a sour stage. A conventional hydrotreating catalyst after a hydrocracking catalyst can be suitable for removal of such mercaptans. For a feed based on a deasphalted oil, the substantially higher percentage of multi-ring structures in the feed can result in formation of polynuclear aromatics during hydrocracking. Such polynuclear aromatics are not as readily treated using a conventional hydrotreating catalyst. However, the larger pore size of a demetallization catalyst (such as 200 nm or greater median pore size) can be allow demetallization catalysts to be effective for saturation of polynuclear aromatics. Such demetallization catalsyts can also be effective for mercaptan removal.

Feedstocks

In various aspects, at least a portion of a feedstock for processing as described herein can correspond to a vacuum resid fraction or another type 950° F.+ (510° C.+) or 1000° F.+ (538° C.+) fraction. Another example of a method for forming a 950° F.+ (510° C.+) or 1000° F.+ (538° C.+) fraction is to perform a high temperature flash separation. The 950° F.+ (510° C.+) or 1000° F.+ (538° C.+) fraction formed from the high temperature flash can be processed in a manner similar to a vacuum resid.

A vacuum resid fraction or a 950° F.+ (510° C.+) fraction formed by another process (such as a flash fractionation bottoms or a bitumen fraction) can be deasphalted at low severity to form a deasphalted oil. Optionally, the feedstock can also include a portion of a conventional feed for lubricant base stock production, such as a vacuum gas oil.

A vacuum resid (or other 510° C.+) fraction can correspond to a fraction with a T5 distillation point (ASTM D2892, or ASTM D7169 if the fraction will not completely elute from a chromatographic system) of at least about 900° F. (482° C.), or at least 950° F. (510° C.), or at least 1000° F. (538° C.). Alternatively, a vacuum resid fraction can be characterized based on a T10 distillation point (ASTM D2892/D7169) of at least about 900° F. (482° C.), or at least 950° F. (510° C.), or at least 1000° F. (538° C.).

Resid (or other 510° C.+) fractions can be high in metals. For example, a resid fraction can be high in total nickel, vanadium and iron contents. In an aspect, a resid fraction can contain at least 0.00005 grams of Ni/V/Fe (50 wppm) or at least 0.0002 grams of Ni/V/Fe (200 wppm) per gram of resid, on a total elemental basis of nickel, vanadium and iron. In other aspects, the heavy oil can contain at least 500 wppm of nickel, vanadium, and iron, such as up to 1000 wppm or more.

Contaminants such as nitrogen and sulfur are typically found in resid (or other 510° C.+) fractions, often in organically-bound form. Nitrogen content can range from about 50 wppm to about 10,000 wppm elemental nitrogen or more, based on total weight of the resid fraction. Sulfur content can range from 500 wppm to 100,000 wppm elemental sulfur or more, based on total weight of the resid fraction, or from 1000 wppm to 50,000 wppm, or from 1000 wppm to 30,000 wppm.

Still another method for characterizing a resid (or other 510° C.+) fraction is based on the Conradson carbon residue (CCR) of the feedstock. The Conradson carbon residue of a resid fraction can be at least about 5 wt %, such as at least about 10 wt % or at least about 20 wt %. Additionally or alternately, the Conradson carbon residue of a resid fraction can be about 50 wt % or less, such as about 40 wt % or less or about 30 wt % or less.

In some aspects, a vacuum gas oil fraction can be co-processed with a deasphalted oil. The vacuum gas oil can be combined with the deasphalted oil in various amounts ranging from 20 parts (by weight) deasphalted oil to 1 part vacuum gas oil (i.e., 20:1) to 1 part deasphalted oil to 1 part vacuum gas oil. In some aspects, the ratio of deasphalted oil to vacuum gas oil can be at least 1:1 by weight, or at least 1.5:1, or at least 2:1. Typical (vacuum) gas oil fractions can include, for example, fractions with a T5 distillation point to T95 distillation point of 650° F. (343° C.)-1050° F. (566° C.) or 650° F. (343° C.)-1000° F. (538° C.) or 650° F. (343° C.)-950° F. (510° C.), or 650° F. (343° C.)-900° F. (482° C.), or ~700° F. (370° C.)-1050° F. (566° C.), or ~700° F. (370° C.)-1000° F. (538° C.) or ~700° F. (370° C.)-950° F. (510° C.) or ~700° F. (370° C.)-900° F. (482° C.), or 750° F. (399° C.)-1050° F. (566° C.), or 750° F. (399° C.)-1000° F. (538° C.), or 750° F. (399° C.)-950° F. (510° C.), or 750° F. (399° C.)-900° F. (482° C.). For example a suitable vacuum gas oil fraction can have a T5 distillation point of at least 343° C. and a T95 distillation point of 566° C. or less; or a T10 distillation point of at least 343° C. and a T90 distillation point of 566° C. or less; or a T5 distillation point of at least 370° C. and a T95 distillation point of 566° C. or less; or a T5 distillation point of at least 343° C. and a T95 distillation point of 538° C. or less.

Solvent Deasphalting

Solvent deasphalting is a solvent extraction process. In some aspects, suitable solvents for methods as described herein include alkanes or other hydrocarbons (such as alkenes) containing 4 to 7 carbons per molecule. Examples of suitable solvents include n-butane, isobutane, n-pentane, $C_{4+}$ alkanes, $C_{5+}$ alkanes, $C_{4+}$ hydrocarbons, and $C_{5+}$ hydrocarbons. In other aspects, suitable solvents can include $C_3$ hydrocarbons, such as propane. In such other aspects, examples of suitable solvents include propane, n-butane, isobutane, n-pentane, $C_{3+}$ alkanes, $C_{4+}$ alkanes, $C_{5+}$ alkanes, $C_{3+}$ hydrocarbons, $C_{4+}$ hydrocarbons, and $C_{5+}$ hydrocarbons In this discussion, a solvent comprising $C_n$ (hydrocarbons) is defined as a solvent composed of at least 80 wt % of alkanes (hydrocarbons) having n carbon atoms, or at least 85 wt %, or at least 90 wt %, or at least 95 wt %, or at least 98 wt %. Similarly, a solvent comprising $C_{n+}$ (hydrocarbons) is defined as a solvent composed of at least 80 wt % of alkanes (hydrocarbons) having n or more carbon atoms, or at least 85 wt %, or at least 90 wt %, or at least 95 wt %, or at least 98 wt %.

In this discussion, a solvent comprising $C_n$ alkanes (hydrocarbons) is defined to include the situation where the solvent corresponds to a single alkane (hydrocarbon) containing n carbon atoms (for example, n=3, 4, 5, 6, 7) as well as the situations where the solvent is composed of a mixture of alkanes (hydrocarbons) containing n carbon atoms. Similarly, a solvent comprising $C_{n+}$ alkanes (hydrocarbons) is defined to include the situation where the solvent corresponds to a single alkane (hydrocarbon) containing n or more carbon atoms (for example, n=3, 4, 5, 6, 7) as well as the situations where the solvent corresponds to a mixture of alkanes (hydrocarbons) containing n or more carbon atoms. Thus, a solvent comprising $C_{4+}$ alkanes can correspond to a solvent including n-butane; a solvent include n-butane and isobutane; a solvent corresponding to a mixture of one or more butane isomers and one or more pentane isomers; or any other convenient combination of alkanes containing 4 or more carbon atoms. Similarly, a solvent comprising $C_{5+}$ alkanes (hydrocarbons) is defined to include a solvent corresponding to a single alkane (hydrocarbon) or a solvent corresponding to a mixture of alkanes (hydrocarbons) that contain 5 or more carbon atoms. Alternatively, other types of solvents may also be suitable, such as supercritical fluids. In various aspects, the solvent for solvent deasphalting can consist essentially of hydrocarbons, so that at least 98 wt % or at least 99 wt % of the solvent corresponds to compounds containing only carbon and hydrogen. In aspects where the deasphalting solvent corresponds to a $C_{4+}$ deasphalting solvent, the $C_{4+}$ deasphalting solvent can include less than 15 wt % propane and/or other $C_3$ hydrocarbons, or less than 10 wt %, or less than 5 wt %, or the $C_{4+}$ deasphalting solvent can be substantially free of propane and/or other $C_3$ hydrocarbons (less than 1 wt %). In aspects where the deasphalting solvent corresponds to a $C_{5+}$ deasphalting solvent, the $C_{5+}$ deasphalting solvent can include less than 15 wt % propane, butane and/or other $C_3$-$C_4$ hydrocarbons, or less than 10 wt %, or less than 5 wt %, or the $C_{5+}$ deasphalting solvent can be substantially free of propane, butane, and/or other $C_3$-$C_4$ hydrocarbons (less than 1 wt %). In aspects where the deasphalting solvent corresponds to a $C_{3+}$ deasphalting solvent, the $C_{3+}$ deasphalting solvent can include less than 10 wt % ethane and/or other $C_2$ hydrocarbons, or less than 5 wt %, or the $C_{3+}$ deasphalting solvent can be substantially free of ethane and/or other $C_2$ hydrocarbons (less than 1 wt %).

Deasphalting of heavy hydrocarbons, such as vacuum resids, is known in the art and practiced commercially. A deasphalting process typically corresponds to contacting a heavy hydrocarbon with an alkane solvent (propane, butane, pentane, hexane, heptane etc and their isomers), either in pure form or as mixtures, to produce two types of product streams. One type of product stream can be a deasphalted oil extracted by the alkane, which is further separated to produce deasphalted oil stream. A second type of product stream can be a residual portion of the feed not soluble in the solvent, often referred to as rock or asphaltene fraction. The deasphalted oil fraction can be further processed into make fuels or lubricants. The rock fraction can be further used as blend component to produce asphalt, fuel oil, and/or other products. The rock fraction can also be used as feed to gasification processes such as partial oxidation, fluid bed combustion or coking processes. The rock can be delivered to these processes as a liquid (with or without additional components) or solid (either as pellets or lumps).

During solvent deasphalting, a resid boiling range feed (optionally also including a portion of a vacuum gas oil feed) can be mixed with a solvent. Portions of the feed that are soluble in the solvent are then extracted, leaving behind a residue with little or no solubility in the solvent.

The portion of the deasphalted feedstock that is extracted with the solvent is often referred to as deasphalted oil. Typical solvent deasphalting conditions include mixing a feedstock fraction with a solvent in a weight ratio of from about 1:2 to about 1:10, such as about 1:8 or less. Typical solvent deasphalting temperatures range from 40° C. to 200° C., or 40° C. to 150° C., depending on the nature of the feed and the solvent. The pressure during solvent deasphalting can be from about 50 psig (345 kPag) to about 500 psig (3447 kPag).

It is noted that the above solvent deasphalting conditions represent a general range, and the conditions will vary depending on the feed. For example, under typical deasphalting conditions, increasing the temperature can tend to reduce the yield while increasing the quality of the resulting deasphalted oil. Under typical deasphalting conditions, increasing the molecular weight of the solvent can tend to increase the yield while reducing the quality of the resulting deasphalted oil, as additional compounds within a resid fraction may be soluble in a solvent composed of higher molecular weight hydrocarbons. Under typical deasphalting conditions, increasing the amount of solvent can tend to increase the yield of the resulting deasphalted oil. As understood by those of skill in the art, the conditions for a particular feed can be selected based on the resulting yield of deasphalted oil from solvent deasphalting. In aspects where a $C_3$ deasphalting solvent is used, the yield from solvent deasphalting can be 40 wt % or less. In some aspects, $C_4$ deasphalting can be performed with a yield of deasphalted oil of 50 wt % or less, or 40 wt % or less. In various aspects, the yield of deasphalted oil from solvent deasphalting with a $C_{4+}$ solvent can be at least 50 wt % relative to the weight of the feed to deasphalting, or at least 55 wt %, or at least 60 wt % or at least 65 wt %, or at least 70 wt %. In aspects where the feed to deasphalting includes a vacuum gas oil portion, the yield from solvent deasphalting can be characterized based on a yield by weight of a 950° F.+ (510° C.) portion of the deasphalted oil relative to the weight of a 510° C.+ portion of the feed. In such aspects where a $C_{4+}$ solvent is used, the yield of 510° C.+ deasphalted oil from solvent deasphalting can be at least 40 wt % relative to the weight of the 510° C.+ portion of the feed to deasphalting, or at least 50 wt %, or at least 55 wt %, or at least 60 wt % or at least 65 wt %, or at least 70 wt %. In such aspects where a $C_{4-}$ solvent is used, the yield of 510° C.+ deasphalted oil from solvent deasphalting can be 50 wt % or less relative to the weight of the 510° C.+ portion of the feed to deasphalting, or 40 wt % or less, or 35 wt % or less.

Hydrotreating and Hydrocracking

After deasphalting, the deasphalted oil (and any additional fractions combined with the deasphalted oil) can undergo further processing to form lubricant base stocks. This can include hydrotreatment and/or hydrocracking to remove heteroatoms to desired levels, reduce Conradson Carbon content, and/or provide viscosity index (VI) uplift. Depending on the aspect, a deasphalted oil can be hydroprocessed by hydrotreating, hydrocracking, or hydrotreating and hydrocracking. Optionally, one or more catalyst beds and/or stages of demetallization catalyst can be included prior to the initial bed of hydrotreating and/or hydrocracking catalyst. Optionally, the hydroprocessing can further include exposing the deasphalted oil to a base metal aromatic saturation catalyst. It is noted that a base metal aromatic saturation catalyst can sometimes be similar to a lower activity hydrotreating catalyst.

The deasphalted oil can be hydrotreated and/or hydrocracked with little or no solvent extraction being performed prior to and/or after the deasphalting. As a result, the deasphalted oil feed for hydrotreatment and/or hydrocracking can have a substantial aromatics content. In various aspects, the aromatics content of the deasphalted oil feed can be at least 50 wt %, or at least 55 wt %, or at least 60 wt %, or at least 65 wt %, or at least 70 wt %, or at least 75 wt %, such as up to 90 wt % or more. Additionally or alternately, the saturates content of the deasphalted oil feed can be 50 wt % or less, or 45 wt % or less, or 40 wt % or less, or 35 wt % or less, or 30 wt % or less, or 25 wt % or less, such as down to 10 wt % or less. In this discussion and the claims below, the aromatics content and/or the saturates content of a fraction can be determined based on ASTM D7419.

The reaction conditions during demetallization and/or hydrotreatment and/or hydrocracking of the deasphalted oil (and optional vacuum gas oil co-feed) can be selected to generate a desired level of conversion of a feed. Any convenient type of reactor, such as fixed bed (for example trickle bed) reactors can be used. Conversion of the feed can be defined in terms of conversion of molecules that boil above a temperature threshold to molecules below that threshold. The conversion temperature can be any convenient temperature, such as ~700° F. (370° C.) or 1050° F. (566° C.). The amount of conversion can correspond to the total conversion of molecules within the combined hydrotreatment and hydrocracking stages for the deasphalted oil. Suitable amounts of conversion of molecules boiling above 1050° F. (566° C.) to molecules boiling below 566° C. include 30 wt % to 90 wt % conversion relative to 566° C., or 30 wt % to 80 wt %, or 30 wt % to 70 wt %, or 40 wt % to 90 wt %, or 40 wt % to 80 wt %, or 40 wt % to 70 wt %, or 50 wt % to 90 wt %, or 50 wt % to 80 wt %, or 50 wt % to 70 wt %. In particular, the amount of conversion relative to 566° C. can be 30 wt % to 90 wt %, or 30 wt % to 70 wt %, or 50 wt % to 90 wt %. Additionally or alternately, suitable amounts of conversion of molecules boiling above ~700° F. (370° C.) to molecules boiling below 370° C. include 10 wt % to 70 wt % conversion relative to 370° C., or 10 wt % to 60 wt %, or 10 wt % to 50 wt %, or 20 wt % to 70 wt %, or 20 wt % to 60 wt %, or 20 wt % to 50 wt %, or 30 wt % to 70 wt %, or 30 wt % to 60 wt %, or 30 wt % to 50 wt %. In particular, the amount of conversion relative to 370° C. can be 10 wt % to 70 wt %, or 20 wt % to 50 wt %, or 30 wt % to 60 wt %.

The hydroprocessed deasphalted oil can also be characterized based on the product quality. After hydroprocessing (hydrotreating and/or hydrocracking), the hydroprocessed deasphalted oil can have a sulfur content of 200 wppm or less, or 100 wppm or less, or 50 wppm or less (such as down to ~0 wppm). Additionally or alternately, the hydroprocessed deasphalted oil can have a nitrogen content of 200 wppm or less, or 100 wppm or less, or 50 wppm or less (such as down to ~0 wppm). Additionally or alternately, the hydroprocessed deasphalted oil can have a Conradson Carbon residue content of 1.5 wt % or less, or 1.0 wt % or less, or 0.7 wt % or less, or 0.1 wt % or less, or 0.02 wt % or less (such as down to ~0 wt %). Conradson Carbon residue content can be determined according to ASTM D4530.

In various aspects, a feed can initially be exposed to a demetallization catalyst prior to exposing the feed to a hydrotreating catalyst. Deasphalted oils can have metals concentrations (Ni+V+Fe) on the order of 10-100 wppm. Exposing a conventional hydrotreating catalyst to a feed having a metals content of 10 wppm or more can lead to catalyst deactivation at a faster rate than may desirable in a commercial setting. Exposing a metal containing feed to a demetallization catalyst prior to the hydrotreating catalyst can allow at least a portion of the metals to be removed by the demetallization catalyst, which can reduce or minimize the deactivation of the hydrotreating catalyst and/or other subsequent catalysts in the process flow. Commercially available demetallization catalysts can be suitable, such as large pore amorphous oxide catalysts that may optionally include Group VI and/or Group VIII non-noble metals to provide some hydrogenation activity.

In various aspects, the deasphalted oil can be exposed to a hydrotreating catalyst under effective hydrotreating conditions. The catalysts used can include conventional hydroprocessing catalysts, such as those comprising at least one Group VIII non-noble metal (Columns 8-10 of IUPAC periodic table), preferably Fe, Co, and/or Ni, such as Co and/or Ni; and at least one Group VI metal (Column 6 of IUPAC periodic table), preferably Mo and/or W. Such hydroprocessing catalysts optionally include transition metal sulfides that are impregnated or dispersed on a refractory support or carrier such as alumina and/or silica. The support or carrier itself typically has no significant/measurable catalytic activity. Substantially carrier- or support-free catalysts, commonly referred to as bulk catalysts, generally have higher volumetric activities than their supported counterparts.

The catalysts can either be in bulk form or in supported form. In addition to alumina and/or silica, other suitable support/carrier materials can include, but are not limited to, zeolites, titania, silica-titania, and titania-alumina. Suitable aluminas are porous aluminas such as gamma or eta having average pore sizes from 50 to 200 Å, or 75 to 150 Å; a surface area from 100 to 300 $m^2/g$, or 150 to 250 $m^2/g$; and a pore volume of from 0.25 to 1.0 $cm^3/g$, or 0.35 to 0.8 $cm^3/g$. More generally, any convenient size, shape, and/or pore size distribution for a catalyst suitable for hydrotreatment of a distillate (including lubricant base stock) boiling range feed in a conventional manner may be used. Preferably, the support or carrier material is an amorphous support, such as a refractory oxide. Preferably, the support or carrier material can be free or substantially free of the presence of molecular sieve, where substantially free of molecular sieve is defined as having a content of molecular sieve of less than about 0.01 wt %.

The at least one Group VIII non-noble metal, in oxide form, can typically be present in an amount ranging from about 2 wt % to about 40 wt %, preferably from about 4 wt % to about 15 wt %. The at least one Group VI metal, in oxide form, can typically be present in an amount ranging from about 2 wt % to about 70 wt %, preferably for supported catalysts from about 6 wt % to about 40 wt % or from about 10 wt % to about 30 wt %. These weight percents are based on the total weight of the catalyst. Suitable metal catalysts include cobalt/molybdenum (1-10% Co as oxide, 10-40% Mo as oxide), nickel/molybdenum (1-10% Ni as oxide, 10-40% Co as oxide), or nickel/tungsten (1-10% Ni as oxide, 10-40% W as oxide) on alumina, silica, silica-alumina, or titania.

The hydrotreatment is carried out in the presence of hydrogen. A hydrogen stream is, therefore, fed or injected into a vessel or reaction zone or hydroprocessing zone in which the hydroprocessing catalyst is located. Hydrogen, which is contained in a hydrogen "treat gas," is provided to the reaction zone. Treat gas, as referred to in this invention, can be either pure hydrogen or a hydrogen-containing gas, which is a gas stream containing hydrogen in an amount that is sufficient for the intended reaction(s), optionally including one or more other gasses (e.g., nitrogen and light hydrocarbons such as methane). The treat gas stream introduced into a reaction stage will preferably contain at least about 50 vol. % and more preferably at least about 75 vol. % hydrogen. Optionally, the hydrogen treat gas can be substantially free (less than 1 vol %) of impurities such as $H_2S$ and $NH_3$ and/or such impurities can be substantially removed from a treat gas prior to use.

Hydrogen can be supplied at a rate of from about 100 SCF/B (standard cubic feet of hydrogen per barrel of feed) (17 $Nm^3/m^3$) to about 10000 SCF/B (1700 $Nm^3/m^3$). Preferably, the hydrogen is provided in a range of from about 200 SCF/B (34 $Nm^3/m^3$) to about 2500 SCF/B (420 $Nm^3/m^3$). Hydrogen can be supplied co-currently with the input feed to the hydrotreatment reactor and/or reaction zone or separately via a separate gas conduit to the hydrotreatment zone.

Hydrotreating conditions can include temperatures of 200° C. to 450° C., or 315° C. to 425° C.; pressures of 250 psig (1.8 MPag) to 5000 psig (34.6 MPag) or 300 psig (2.1 MPag) to 3000 psig (20.8 MPag); liquid hourly space velocities (LHSV) of 0.1 $hr^{-1}$ to 10 $hr^{-1}$; and hydrogen treat rates of 200 scf/B (35.6 $m^3/m^3$) to 10,000 scf/B (1781 $m^3/m^3$), or 500 (89 $m^3/m^3$) to 10,000 scf/B (1781 $m^3/m^3$).

In various aspects, the deasphalted oil can be exposed to a hydrocracking catalyst under effective hydrocracking conditions. Hydrocracking catalysts typically contain sulfided base metals on acidic supports, such as amorphous silica alumina, cracking zeolites such as USY, or acidified alumina. Often these acidic supports are mixed or bound with other metal oxides such as alumina, titania or silica. Examples of suitable acidic supports include acidic molecular sieves, such as zeolites or silicoaluminophosphates. One example of suitable zeolite is USY, such as a USY zeolite with cell size of 24.30 Angstroms or less. Additionally or alternately, the catalyst can be a low acidity molecular sieve, such as a USY zeolite with a Si to Al ratio of at least about 20, and preferably at least about 40 or 50. ZSM-48, such as ZSM-48 with a $SiO_2$ to $Al_2O_3$ ratio of about 110 or less, such as about 90 or less, is another example of a potentially suitable hydrocracking catalyst. Still another option is to use a combination of USY and ZSM-48. Still other options include using one or more of zeolite Beta, ZSM-5, ZSM-35, or ZSM-23, either alone or in combination with a USY catalyst. Non-limiting examples of metals for hydrocracking catalysts include metals or combinations of metals that include at least one Group VIII metal, such as nickel, nickel-cobalt-molybdenum, cobalt-molybdenum, nickel-tungsten, nickel-molybdenum, and/or nickel-molybdenum-tungsten. Additionally or alternately, hydrocracking catalysts with noble metals can also be used. Non-limiting examples of noble metal catalysts include those based on platinum and/or palladium. Support materials which may be used for both the noble and non-noble metal catalysts can comprise a refractory oxide material such as alumina, silica, alumina-silica, kieselguhr, diatomaceous earth, magnesia, zirconia, or combinations thereof, with alumina, silica, alumina-silica being the most common (and preferred, in one embodiment).

When only one hydrogenation metal is present on a hydrocracking catalyst, the amount of that hydrogenation metal can be at least about 0.1 wt % based on the total weight of the catalyst, for example at least about 0.5 wt % or at least about 0.6 wt %. Additionally or alternately when only one hydrogenation metal is present, the amount of that hydrogenation metal can be about 5.0 wt % or less based on the total weight of the catalyst, for example about 3.5 wt % or less, about 2.5 wt % or less, about 1.5 wt % or less, about 1.0 wt % or less, about 0.9 wt % or less, about 0.75 wt % or less, or about 0.6 wt % or less. Further additionally or alternately when more than one hydrogenation metal is present, the collective amount of hydrogenation metals can be at least about 0.1 wt % based on the total weight of the catalyst, for example at least about 0.25 wt %, at least about 0.5 wt %, at least about 0.6 wt %, at least about 0.75 wt %, or at least about 1 wt %. Still further additionally or alternately when more than one hydrogenation metal is present, the collective amount of hydrogenation metals can be about 35 wt % or less based on the total weight of the catalyst, for example about 30 wt % or less, about 25 wt % or less, about 20 wt % or less, about 15 wt % or less, about 10 wt % or less, or about 5 wt % or less. In embodiments wherein the supported metal comprises a noble metal, the amount of noble metal(s) is typically less than about 2 wt %, for example less than about 1 wt %, about 0.9 wt % or less, about 0.75 wt % or less, or about 0.6 wt % or less. It is noted that hydrocracking under sour conditions is typically performed using a base metal (or metals) as the hydrogenation metal.

In various aspects, the conditions selected for hydrocracking for lubricant base stock production can depend on the desired level of conversion, the level of contaminants in the input feed to the hydrocracking stage, and potentially other factors. For example, hydrocracking conditions in a single stage, or in the first stage and/or the second stage of a multi-stage system, can be selected to achieve a desired level of conversion in the reaction system. Hydrocracking conditions can be referred to as sour conditions or sweet conditions, depending on the level of sulfur and/or nitrogen present within a feed. For example, a feed with 100 wppm or less of sulfur and 50 wppm or less of nitrogen, preferably less than 25 wppm sulfur and/or less than 10 wppm of nitrogen, represent a feed for hydrocracking under sweet conditions. In various aspects, hydrocracking can be performed on a thermally cracked resid, such as a deasphalted oil derived from a thermally cracked resid. In some aspects, such as aspects where an optional hydrotreating step is used prior to hydrocracking, the thermally cracked resid may correspond to a sweet feed. In other aspects, the thermally cracked resid may represent a feed for hydrocracking under sour conditions.

A hydrocracking process under sour conditions can be carried out at temperatures of about 550° F. (288° C.) to about 840° F. (449° C.), hydrogen partial pressures of from about 1500 psig to about 5000 psig (10.3 MPag to 34.6 MPag), liquid hourly space velocities of from 0.05 $h^{-1}$ to 10 $h^{-1}$, and hydrogen treat gas rates of from 35.6 $m^3/m^3$ to 1781 $m^3/m^3$ (200 SCF/B to 10,000 SCF/B). In other embodiments, the conditions can include temperatures in the range of about 600° F. (343° C.) to about 815° F. (435° C.), hydrogen partial pressures of from about 1500 psig to about 3000 psig (10.3 MPag-20.9 MPag), and hydrogen treat gas rates of from about 213 $m^3/m^3$ to about 1068 $m^3/m^3$ (1200 SCF/B to 6000 SCF/B). The LHSV can be from about 0.25 $h^{-1}$ to about 50 $h^{-1}$, or from about 0.5 $h^{-1}$ to about 20 $h^{-1}$, preferably from about 1.0 $h^{-1}$ to about 4.0 $h^{-1}$.

In some aspects, a portion of the hydrocracking catalyst can be contained in a second reactor stage. In such aspects, a first reaction stage of the hydroprocessing reaction system can include one or more hydrotreating and/or hydrocracking catalysts. The conditions in the first reaction stage can be suitable for reducing the sulfur and/or nitrogen content of the feedstock. A separator can then be used in between the first and second stages of the reaction system to remove gas phase sulfur and nitrogen contaminants. One option for the separator is to simply perform a gas-liquid separation to remove contaminant. Another option is to use a separator such as a flash separator that can perform a separation at a higher temperature. Such a high temperature separator can be used, for example, to separate the feed into a portion boiling below a temperature cut point, such as about 350° F. (177° C.) or about 400° F. (204° C.), and a portion boiling above the temperature cut point. In this type of separation, the naphtha boiling range portion of the effluent from the first reaction stage can also be removed, thus reducing the volume of effluent that is processed in the second or other subsequent stages. Of course, any low boiling contaminants in the effluent from the first stage would also be separated into the portion boiling below the temperature cut point. If sufficient contaminant removal is performed in the first stage, the second stage can be operated as a "sweet" or low contaminant stage.

Still another option can be to use a separator between the first and second stages of the hydroprocessing reaction system that can also perform at least a partial fractionation of the effluent from the first stage. In this type of aspect, the effluent from the first hydroprocessing stage can be separated into at least a portion boiling below the distillate (such as diesel) fuel range, a portion boiling in the distillate fuel range, and a portion boiling above the distillate fuel range. The distillate fuel range can be defined based on a conventional diesel boiling range, such as having a lower end cut point temperature of at least about 350° F. (177° C.) or at least about 400° F. (204° C.) to having an upper end cut point temperature of about 700° F. (371° C.) or less or 650° F. (343° C.) or less. Optionally, the distillate fuel range can be extended to include additional kerosene, such as by selecting a lower end cut point temperature of at least about 300° F. (149° C.).

In aspects where the inter-stage separator is also used to produce a distillate fuel fraction, the portion boiling below the distillate fuel fraction includes, naphtha boiling range molecules, light ends, and contaminants such as $H_2S$. These different products can be separated from each other in any convenient manner. Similarly, one or more distillate fuel fractions can be formed, if desired, from the distillate boiling range fraction. The portion boiling above the distillate fuel range represents the potential lubricant base stocks. In such aspects, the portion boiling above the distillate fuel range is subjected to further hydroprocessing in a second hydroprocessing stage.

A hydrocracking process under sweet conditions can be performed under conditions similar to those used for a sour hydrocracking process, or the conditions can be different. In an embodiment, the conditions in a sweet hydrocracking stage can have less severe conditions than a hydrocracking process in a sour stage. Suitable hydrocracking conditions for a non-sour stage can include, but are not limited to, conditions similar to a first or sour stage. Suitable hydrocracking conditions can include temperatures of about 500° F. (260° C.) to about 840° F. (449° C.), hydrogen partial pressures of from about 1500 psig to about 5000 psig (10.3 MPag to 34.6 MPag), liquid hourly space velocities of from 0.05 $h^{-1}$ to 10 $h^{-1}$, and hydrogen treat gas rates of from 35.6 $m^3/m^3$ to 1781 $m^3/m^3$ (200 SCF/B to 10,000 SCF/B). In other embodiments, the conditions can include temperatures in the range of about 600° F. (343° C.) to about 815° F. (435° C.), hydrogen partial pressures of from about 1500 psig to about 3000 psig (10.3 MPag-20.9 MPag), and hydrogen treat gas rates of from about 213 $m^3/m^3$ to about 1068 $m^3/m^3$ (1200 SCF/B to 6000 SCF/B). The LHSV can be from about 0.25 h$^{-1}$ to about 50 h$^{-1}$, or from about 0.5 h$^{-1}$ to about 20 h$^{-1}$, preferably from about 1.0 h$^{-1}$ to about 4.0 h$^{-1}$.

In still another aspect, the same conditions can be used for hydrotreating and hydrocracking beds or stages, such as using hydrotreating conditions for both or using hydrocracking conditions for both. In yet another embodiment, the pressure for the hydrotreating and hydrocracking beds or stages can be the same.

In yet another aspect, a hydroprocessing reaction system may include more than one hydrocracking stage. If multiple hydrocracking stages are present, at least one hydrocracking stage can have effective hydrocracking conditions as described above, including a hydrogen partial pressure of at least about 1500 psig (10.3 MPag). In such an aspect, other hydrocracking processes can be performed under conditions that may include lower hydrogen partial pressures. Suitable hydrocracking conditions for an additional hydrocracking stage can include, but are not limited to, temperatures of about 500° F. (260° C.) to about 840° F. (449° C.), hydrogen partial pressures of from about 250 psig to about 5000 psig (1.8 MPag to 34.6 MPag), liquid hourly space velocities of from 0.05 h$^{-1}$ to 10 h$^{-1}$, and hydrogen treat gas rates of from 35.6 m$^3$/m$^3$ to 1781 m$^3$/m$^3$ (200 SCF/B to 10,000 SCF/B). In other embodiments, the conditions for an additional hydrocracking stage can include temperatures in the range of about 600° F. (343° C.) to about 815° F. (435° C.), hydrogen partial pressures of from about 500 psig to about 3000 psig (3.5 MPag-20.9 MPag), and hydrogen treat gas rates of from about 213 m$^3$/m$^3$ to about 1068 m$^3$/m$^3$ (1200 SCF/B to 6000 SCF/B). The LHSV can be from about 0.25 h$^{-1}$ to about 50 h$^{-1}$, or from about 0.5 h$^{-1}$ to about 20 h$^{-1}$, and preferably from about 1.0 h$^{-1}$ to about 4.0 h$^{-1}$.

Hydroprocessed Effluent—Solvent Dewaxing to Form Group I Bright Stock

The hydroprocessed deasphalted oil (optionally including hydroprocessed vacuum gas oil) can be separated to form one or more fuel boiling range fractions (such as naphtha or distillate fuel boiling range fractions) and at least one lubricant base stock boiling range fraction. The lubricant base stock boiling range fraction(s) can then be solvent dewaxed to produce a lubricant base stock product with a reduced (or eliminated) tendency to form haze. Lubricant base stocks (including bright stock) formed by hydroprocessing a deasphalted oil and then solvent dewaxing the hydroprocessed effluent can tend to be Group I base stocks due to having an aromatics content of at least 10 wt %.

Solvent dewaxing typically involves mixing a feed with chilled dewaxing solvent to form an oil-solvent solution. Precipitated wax is thereafter separated by, for example, filtration. The temperature and solvent are selected so that the oil is dissolved by the chilled solvent while the wax is precipitated.

An example of a suitable solvent dewaxing process involves the use of a cooling tower where solvent is prechilled and added incrementally at several points along the height of the cooling tower. The oil-solvent mixture is agitated during the chilling step to permit substantially instantaneous mixing of the prechilled solvent with the oil. The prechilled solvent is added incrementally along the length of the cooling tower so as to maintain an average chilling rate at or below 10° F. per minute, usually between about 1 to about 5° F. per minute. The final temperature of the oil-solvent/precipitated wax mixture in the cooling tower will usually be between 0 and 50° F. (−17.8 to 10° C.). The mixture may then be sent to a scraped surface chiller to separate precipitated wax from the mixture.

Representative dewaxing solvents are aliphatic ketones having 3-6 carbon atoms such as methyl ethyl ketone and methyl isobutyl ketone, low molecular weight hydrocarbons such as propane and butane, and mixtures thereof. The solvents may be mixed with other solvents such as benzene, toluene or xylene.

In general, the amount of solvent added will be sufficient to provide a liquid/solid weight ratio between the range of 5/1 and 20/1 at the dewaxing temperature and a solvent/oil volume ratio between 1.5/1 to 5/1. The solvent dewaxed oil can be dewaxed to a pour point of −6° C. or less, or −10° C. or less, or −15° C. or less, depending on the nature of the target lubricant base stock product. Additionally or alternately, the solvent dewaxed oil can be dewaxed to a cloud point of −2° C. or less, or −5° C. or less, or −10° C. or less, depending on the nature of the target lubricant base stock product. The resulting solvent dewaxed oil can be suitable for use in forming one or more types of Group I base stocks. Preferably, a bright stock formed from the solvent dewaxed oil can have a cloud point below −5° C. The resulting solvent dewaxed oil can have a viscosity index of at least 90, or at least 95, or at least 100. Preferably, at least 10 wt % of the resulting solvent dewaxed oil (or at least 20 wt %, or at least 30 wt %) can correspond to a Group I bright stock having a kinematic viscosity at 100° C. of at least 15 cSt, or at least 20 cSt, or at least 25 cSt, such as up to 50 cSt or more.

In some aspects, the reduced or eliminated tendency to form haze for the lubricant base stocks formed from the solvent dewaxed oil can be demonstrated by a reduced or minimized difference between the cloud point temperature and pour point temperature for the lubricant base stocks. In various aspects, the difference between the cloud point and pour point for the resulting solvent dewaxed oil and/or for one or more lubricant base stocks, including one or more bright stocks, formed from the solvent dewaxed oil, can be 22° C. or less, or 20° C. or less, or 15° C. or less, or 10° C. or less, or 8° C. or less, or 5° C. or less. Additionally or alternately, a reduced or minimized tendency for a bright stock to form haze over time can correspond to a bright stock having a cloud point of −10° C. or less, or −8° C. or less, or −5° C. or less, or −2° C. or less.

Additional Hydroprocessing—Catalytic Dewaxing, Hydrofinishing, and Optional Hydrocracking In some alternative aspects, at least a lubricant boiling range portion of the hydroprocessed deasphalted oil can be exposed to further hydroprocessing (including catalytic dewaxing) to form either Group I and/or Group II base stocks, including Group I and/or Group II bright stock. In some aspects, a first lubricant boiling range portion of the hydroprocessed deasphalted oil can be solvent dewaxed as described above while a second lubricant boiling range portion can be exposed to further hydroprocessing. In other aspects, only solvent dewaxing or only further hydroprocessing can be used to treat a lubricant boiling range portion of the hydroprocessed deasphalted oil.

Optionally, the further hydroprocessing of the lubricant boiling range portion of the hydroprocessed deasphalted oil can also include exposure to hydrocracking conditions before and/or after the exposure to the catalytic dewaxing conditions. At this point in the process, the hydrocracking can be considered "sweet" hydrocracking, as the hydroprocessed deasphalted oil can have a sulfur content of 200 wppm or less.

Suitable hydrocracking conditions can include exposing the feed to a hydrocracking catalyst as previously described above. Optionally, it can be preferable to use a USY zeolite with a silica to alumina ratio of at least 30 and a unit cell size of less than 24.32 Angstroms as the zeolite for the hydrocracking catalyst, in order to improve the VI uplift from hydrocracking and/or to improve the ratio of distillate fuel yield to naphtha fuel yield in the fuels boiling range product.

Suitable hydrocracking conditions can also include temperatures of about 500° F. (260° C.) to about 840° F. (449° C.), hydrogen partial pressures of from about 1500 psig to about 5000 psig (10.3 MPag to 34.6 MPag), liquid hourly space velocities of from 0.05 $h^{-1}$ to 10 $h^{-1}$, and hydrogen treat gas rates of from 35.6 $m^3/m^3$ to 1781 $m^3/m^3$ (200 SCF/B to 10,000 SCF/B). In other embodiments, the conditions can include temperatures in the range of about 600° F. (343° C.) to about 815° F. (435° C.), hydrogen partial pressures of from about 1500 psig to about 3000 psig (10.3 MPag-20.9 MPag), and hydrogen treat gas rates of from about 213 $m^3/m^3$ to about 1068 $m^3/m^3$ (1200 SCF/B to 6000 SCF/B). The LHSV can be from about 0.25 $h^{-1}$ to about 50 $h^{-1}$, or from about 0.5 $h^{-1}$ to about 20 $h^{-1}$, and preferably from about 1.0 $h^{-1}$ to about 4.0 $h^{-1}$.

For catalytic dewaxing, suitable dewaxing catalysts can include molecular sieves such as crystalline aluminosilicates (zeolites). In an embodiment, the molecular sieve can comprise, consist essentially of, or be ZSM-22, ZSM-23, ZSM-48. Optionally but preferably, molecular sieves that are selective for dewaxing by isomerization as opposed to cracking can be used, such as ZSM-48, ZSM-23, or a combination thereof. Additionally or alternately, the molecular sieve can comprise, consist essentially of, or be a 10-member ring 1-D molecular sieve, such as EU-2, EU-11, ZBM-30, ZSM-48, or ZSM-23. ZSM-48 is most preferred. Note that a zeolite having the ZSM-23 structure with a silica to alumina ratio of from about 20:1 to about 40:1 can sometimes be referred to as SSZ-32. Optionally but preferably, the dewaxing catalyst can include a binder for the molecular sieve, such as alumina, titania, silica, silica-alumina, zirconia, or a combination thereof, for example alumina and/or titania or silica and/or zirconia and/or titania.

Preferably, the dewaxing catalysts used in processes according to the invention are catalysts with a low ratio of silica to alumina. For example, for ZSM-48, the ratio of silica to alumina in the zeolite can be about 100:1 or less, such as about 90:1 or less, or about 75:1 or less, or about 70:1 or less. Additionally or alternately, the ratio of silica to alumina in the ZSM-48 can be at least about 50:1, such as at least about 60:1, or at least about 65:1.

In various embodiments, the catalysts according to the invention further include a metal hydrogenation component. The metal hydrogenation component is typically a Group VI and/or a Group VIII metal. Preferably, the metal hydrogenation component can be a combination of a non-noble Group VIII metal with a Group VI metal. Suitable combinations can include Ni, Co, or Fe with Mo or W, preferably Ni with Mo or W.

The metal hydrogenation component may be added to the catalyst in any convenient manner. One technique for adding the metal hydrogenation component is by incipient wetness. For example, after combining a zeolite and a binder, the combined zeolite and binder can be extruded into catalyst particles. These catalyst particles can then be exposed to a solution containing a suitable metal precursor. Alternatively, metal can be added to the catalyst by ion exchange, where a metal precursor is added to a mixture of zeolite (or zeolite and binder) prior to extrusion.

The amount of metal in the catalyst can be at least 0.1 wt % based on catalyst, or at least 0.5 wt %, or at least 1.0 wt %, or at least 2.5 wt %, or at least 5.0 wt %, based on catalyst. The amount of metal in the catalyst can be 20 wt % or less based on catalyst, or 10 wt % or less, or 5 wt % or less, or 2.5 wt % or less, or 1 wt % or less. For embodiments where the metal is a combination of a non-noble Group VIII metal with a Group VI metal, the combined amount of metal can be from 0.5 wt % to 20 wt %, or 1 wt % to 15 wt %, or 2.5 wt % to 10 wt %.

The dewaxing catalysts useful in processes according to the invention can also include a binder. In some embodiments, the dewaxing catalysts used in process according to the invention are formulated using a low surface area binder, a low surface area binder represents a binder with a surface area of 100 $m^2/g$ or less, or 80 $m^2/g$ or less, or 70 $m^2/g$ or less. Additionally or alternately, the binder can have a surface area of at least about 25 $m^2/g$. The amount of zeolite in a catalyst formulated using a binder can be from about 30 wt % zeolite to 90 wt % zeolite relative to the combined weight of binder and zeolite. Preferably, the amount of zeolite is at least about 50 wt % of the combined weight of zeolite and binder, such as at least about 60 wt % or from about 65 wt % to about 80 wt %.

Without being bound by any particular theory, it is believed that use of a low surface area binder reduces the amount of binder surface area available for the hydrogenation metals supported on the catalyst. This leads to an increase in the amount of hydrogenation metals that are supported within the pores of the molecular sieve in the catalyst.

A zeolite can be combined with binder in any convenient manner. For example, a bound catalyst can be produced by starting with powders of both the zeolite and binder, combining and mulling the powders with added water to form a mixture, and then extruding the mixture to produce a bound catalyst of a desired size. Extrusion aids can also be used to modify the extrusion flow properties of the zeolite and binder mixture. The amount of framework alumina in the catalyst may range from 0.1 to 3.33 wt %, or 0.1 to 2.7 wt %, or 0.2 to 2 wt %, or 0.3 to 1 wt %.

Effective conditions for catalytic dewaxing of a feedstock in the presence of a dewaxing catalyst can include a temperature of from 280° C. to 450° C., preferably 343° C. to 435° C., a hydrogen partial pressure of from 3.5 MPag to 34.6 MPag (500 psig to 5000 psig), preferably 4.8 MPag to 20.8 MPag, and a hydrogen circulation rate of from 178 $m^3/m^3$ (1000 SCF/B) to 1781 $m^3/m^3$ (10,000 scf/B), preferably 213 $m^3/m^3$ (1200 SCF/B) to 1068 $m^3/m^3$ (6000 SCF/B). The LHSV can be from about 0.2 to about 10 $h^{-1}$, such as from about 0.5 $h^{-1}$ to about 5 $h^{-1}$ and/or from about 1 $h^{-1}$ to about 4 $h^{-1}$.

Before and/or after catalytic dewaxing, the hydroprocessed deasphalted oil (i.e., at least a lubricant boiling range portion thereof) can optionally be exposed to an aromatic saturation catalyst, which can alternatively be referred to as a hydrofinishing catalyst. Exposure to the aromatic saturation catalyst can occur either before or after fractionation. If aromatic saturation occurs after fractionation, the aromatic saturation can be performed on one or more portions of the fractionated product. Alternatively, the entire effluent from the last hydrocracking or dewaxing process can be hydrofinished and/or undergo aromatic saturation.

Hydrofinishing and/or aromatic saturation catalysts can include catalysts containing Group VI metals, Group VIII metals, and mixtures thereof. In an embodiment, preferred metals include at least one metal sulfide having a strong hydrogenation function. In another embodiment, the hydrofinishing catalyst can include a Group VIII noble metal, such as Pt, Pd, or a combination thereof. The mixture of metals may also be present as bulk metal catalysts wherein the amount of metal is about 30 wt. % or greater based on catalyst. For supported hydrotreating catalysts, suitable metal oxide supports include low acidic oxides such as silica, alumina, silica-aluminas or titania, preferably alumina. The preferred hydrofinishing catalysts for aromatic saturation will comprise at least one metal having relatively strong hydrogenation function on a porous support. Typical support materials include amorphous or crystalline oxide materials such as alumina, silica, and silica-alumina. The support materials may also be modified, such as by halogenation, or in particular fluorination. The metal content of the catalyst is often as high as about 20 weight percent for non-noble metals. In an embodiment, a preferred hydrofinishing catalyst can include a crystalline material belonging to the M41S class or family of catalysts. The M41S family of catalysts are mesoporous materials having high silica content. Examples include MCM-41, MCM-48 and MCM-50. A preferred member of this class is MCM-41.

Hydrofinishing conditions can include temperatures from about 125° C. to about 425° C., preferably about 180° C. to about 280° C., a hydrogen partial pressure from about 500 psig (3.4 MPa) to about 3000 psig (20.7 MPa), preferably about 1500 psig (10.3 MPa) to about 2500 psig (17.2 MPa), and liquid hourly space velocity from about 0.1 hr$^{-1}$ to about 5 hr$^{-1}$ LHSV, preferably about 0.5 hr$^{-1}$ to about 1.5 hr$^{-1}$. Additionally, a hydrogen treat gas rate of from 35.6 m$^3$/m$^3$ to 1781 m$^3$/m$^3$ (200 SCF/B to 10,000 SCF/B) can be used.

Solvent Processing of Catalytically Dewaxed Effluent or Input Flow to Catalytic Dewaxing For deasphalted oils derived from propane deasphalting, the further hydroprocessing (including catalytic dewaxing) can be sufficient to form bright stocks with low haze formation and unexpected compositional properties. For deasphalted oils derived from $C_{4+}$ deasphalting, after the further hydroprocessing (including catalytic dewaxing), the heavy portion of the resulting catalytically dewaxed effluent can be solvent processed to form one or more lubricant bright stock products with a reduced or eliminated tendency to form haze. The type of solvent processing can be dependent on the nature of the initial hydroprocessing (hydrotreatment and/or hydrocracking) and the nature of the further hydroprocessing (including dewaxing). The heavy neutral and light neutral base stock products can be suitable for use (i.e., no haze formation) without further solvent processing.

In aspects where the initial hydroprocessing is less severe, corresponding to 10 wt % to 40 wt % conversion relative to ~700° F. (370° C.), the subsequent solvent processing for bright stock formation can correspond to solvent dewaxing. The solvent dewaxing can be performed in a manner similar to the solvent dewaxing described above. However, this solvent dewaxing can be used to produce a Group II lubricant base stock. In some aspects, when the initial hydroprocessing corresponds to 10 wt % to 40 wt % conversion relative to 370° C., the catalytic dewaxing during further hydroprocessing can also be performed at lower severity, so that at least 6 wt % wax remains in the catalytically dewaxed effluent, or at least 8 wt %, or at least 10 wt %, or at least 12 wt %, or at least 15 wt %, such as up to 20 wt %. The solvent dewaxing can then be used to reduce the wax content in the catalytically dewaxed effluent by 2 wt % to 10 wt %. This can produce a solvent dewaxed oil product having a wax content of 0.1 wt % to 12 wt %, or 0.1 wt % to 10 wt %, or 0.1 wt % to 8 wt %, or 0.1 wt % to 6 wt %, or 1 wt % to 12 wt %, or 1 wt % to 10 wt %, or 1 wt % to 8 wt %, or 4 wt % to 12 wt %, or 4 wt % to 10 wt %, or 4 wt % to 8 wt %, or 6 wt % to 12 wt %, or 6 wt % to 10 wt %. In particular, the solvent dewaxed oil can have a wax content of 0.1 wt % to 12 wt %, or 0.1 wt % to 6 wt %, or 1 wt % to 10 wt %, or 4 wt % to 12 wt %.

In other aspects, the subsequent solvent processing for bright stock formation can correspond to solvent extraction. Solvent extraction can be used to reduce the aromatics content and/or the amount of polar molecules. The solvent extraction process selectively dissolves aromatic components to form an aromatics-rich extract phase while leaving the more paraffinic components in an aromatics-poor raffinate phase. Naphthenes are distributed between the extract and raffinate phases. Typical solvents for solvent extraction include phenol, furfural and N-methyl pyrrolidone. By controlling the solvent to oil ratio, extraction temperature and method of contacting distillate to be extracted with solvent, one can control the degree of separation between the extract and raffinate phases. Any convenient type of liquid-liquid extractor can be used, such as a counter-current liquid-liquid extractor. Depending on the initial concentration of aromatics in the deasphalted oil, the raffinate phase can have an aromatics content of 5 wt % to 25 wt %. For typical feeds, the aromatics contents can be at least 10 wt %.

Optionally, the raffinate from the solvent extraction can be under-extracted. In such aspects, the extraction is carried out under conditions such that the raffinate yield is maximized while still removing most of the lowest quality molecules from the feed. Raffinate yield may be maximized by controlling extraction conditions, for example, by lowering the solvent to oil treat ratio and/or decreasing the extraction temperature. In various aspects, the raffinate yield from solvent extraction can be at least 40 wt %, or at least 50 wt %, or at least 60 wt %, or at least 70 wt %.

The solvent processed oil (solvent dewaxed or solvent extracted) can have a pour point of −6° C. or les, or −10° C. or less, or −15° C. or less, or −20° C. or less, depending on the nature of the target lubricant base stock product. Additionally or alternately, the solvent processed oil (solvent dewaxed or solvent extracted) can have a cloud point of −2° C. or less, or −5° C. or less, or −10° C. or less, depending on the nature of the target lubricant base stock product. Pour points and cloud points can be determined according to ASTM D97 and ASTM D2500, respectively. The resulting solvent processed oil can be suitable for use in forming one or more types of Group II base stocks. The resulting solvent dewaxed oil can have a viscosity index of at least 80, or at least 90, or at least 95, or at least 100, or at least 110, or at least 120. Viscosity index can be determined according to ASTM D2270. Preferably, at least 10 wt % of the resulting solvent processed oil (or at least 20 wt %, or at least 30 wt %) can correspond to a Group II bright stock having a kinematic viscosity at 100° C. of at least 14 cSt, or at least 15 cSt, or at least 20 cSt, or at least 25 cSt, or at least 30 cSt, or at least 32 cSt, such as up to 50 cSt or more. Additionally or alternately, the Group II bright stock can have a kinematic viscosity at 40° C. of at least 300 cSt, or at least 320 cSt, or at least 340 cSt, or at least 350 cSt, such as up to 500 cSt or more. Kinematic viscosity can be determined according to ASTM D445. Additionally or alternately, the Conradson Carbon residue content can be about 0.1 wt % or less, or about 0.02 wt % or less. Conradson Carbon residue content can be determined according to ASTM D4530. Additionally or alternately, the resulting base stock can have a turbidity of at least 1.5 (in combination with a cloud point of less than 0° C.), or can have a turbidity of at least 2.0, and/or can have a turbidity of 4.0 or less, or 3.5 or less, or 3.0 or less. In particular, the turbidity can be 1.5 to 4.0, or 1.5 to 3.0, or 2.0 to 4.0, or 2.0 to 3.5.

The reduced or eliminated tendency to form haze for the lubricant base stocks formed from the solvent processed oil can be demonstrated by the reduced or minimized difference between the cloud point temperature and pour point temperature for the lubricant base stocks. In various aspects, the difference between the cloud point and pour point for the resulting solvent dewaxed oil and/or for one or more Group II lubricant base stocks, including one or more bright stocks, formed from the solvent processed oil, can be 22° C. or less, or 20° C. or less, or 15° C. or less, or 10° C. or less, such as down to about 1° C. of difference.

In some alternative aspects, the above solvent processing can be performed prior to catalytic dewaxing.

Group II Base Stock Products

For deasphalted oils derived from propane, butane, pentane, hexane and higher or mixtures thereof, the further hydroprocessing (including catalytic dewaxing) and potentially solvent processing can be sufficient to form lubricant bright stocks with low haze formation (or no haze formation) and novel compositional properties. Traditional products manufactured today with kinematic viscosity of about 32 cSt at 100° C. contain aromatics that are >10% and/or sulfur that is >0.03% of the base oil. Such bright stocks can have a kinematic viscosity of at least 14 cSt, or at least 20 cSt, or at least 25 cSt, or at least 30 cSt, or at least 32 cSt at 100° C. and can contain less than 10 wt % aromatics/greater than 90 wt % saturates and less than 0.03% sulfur.

During block processing, heavy neutral and light neutral products can also be formed. For base stocks produced during a light neutral or heavy neutral production block, the resulting base stocks can be produced without subsequent solvent processing while having substantially no haze formation. The light neutral base stocks can have, for example, a kinematic viscosity at 100° C. of 3.5 cSt to 6.5 cSt, or 4.0 cSt to 6.0 cSt. The heavy neutral base stocks can have, for example, a kinematic viscosity at 100° C. of 8.0 cSt to 15 cSt, or 9.0 cSt to 14 cSt. The heavy neutral and light neutral base stocks can have a saturates content of 90 wt % or more, or 95 wt % or more, or 98 wt % or more, or 99 wt % or more.

A formulated lubricating oil useful in the present disclosure may contain one or more of the other commonly used lubricating oil performance additives including but not limited to antiwear additives, detergents, dispersants, viscosity modifiers, corrosion inhibitors, rust inhibitors, metal deactivators, extreme pressure additives, anti-seizure agents, wax modifiers, other viscosity modifiers, fluid-loss additives, seal compatibility agents, lubricity agents, anti-staining agents, chromophoric agents, defoamants, demulsifiers, emulsifiers, densifiers, wetting agents, gelling agents, tackiness agents, colorants, and others. For a review of many commonly used additives, see "Lubricant Additives, Chemistry and Applications", Ed. L. R. Rudnick, Marcel Dekker, Inc. 270 Madison Ave. New York, N.J. 10016, 2003, and Klamann in Lubricants and Related Products, Verlag Chemie, Deerfield Beach, Fla.; ISBN 0-89573-177-0. Reference is also made to "Lubricant Additives" by M. W. Ranney, published by Noyes Data Corporation of Parkridge, NJ (1973); see also U.S. Pat. No. 7,704,930, the disclosure of which is incorporated herein in its entirety. These additives are commonly delivered with varying amounts of diluent oil that may range from 5 weight percent to 50 weight percent.

The additives useful in this disclosure do not have to be soluble in the lubricating oils. Insoluble additives such as zinc stearate in oil can be dispersed in the lubricating oils of this disclosure.

When lubricating oil compositions contain one or more additives, the additive(s) are blended into the composition in an amount sufficient for it to perform its intended function. Additives are typically present in lubricating oil compositions as a minor component, typically in an amount of less than 50 weight percent, preferably less than about 30 weight percent, and more preferably less than about 15 weight percent, based on the total weight of the composition. Additives are most often added to lubricating oil compositions in an amount of at least 0.1 weight percent, preferably at least 1 weight percent, more preferably at least 5 weight percent. Typical amounts of such additives useful in the present disclosure are shown in Table 1 below.

It is noted that many of the additives are shipped from the additive manufacturer as a concentrate, containing one or more additives together, with a certain amount of base oil diluents. Accordingly, the weight amounts in the Table A below, as well as other amounts mentioned herein, are directed to the amount of active ingredient (that is the non-diluent portion of the ingredient). The weight percent (wt %) indicated below is based on the total weight of the lubricating oil composition.

TABLE A

Typical Amounts of Other Lubricating Oil Components

| Compound | Approximate wt % (Useful) | Approximate wt % (Preferred) |
|---|---|---|
| Dispersant | 0.1-20 | 0.1-8 |
| Detergent | 0.1-20 | 0.1-8 |
| Friction Modifier | 0.01-5 | 0.01-1.5 |
| Antioxidant | 0.1-5 | 0.1-1.5 |
| Pour Point Depressant (PPD) | 0.0-5 | 0.01-1.5 |
| Anti-foam Agent | 0.001-3 | 0.001-0.15 |
| Viscosity Modifier (solid polymer basis) | 0.1-2 | 0.1-1 |
| Antiwear | 0.2-3 | 0.5-1 |
| Inhibitor and Antirust | 0.01-5 | 0.01-1.5 |

The foregoing additives are all commercially available materials. These additives may be added independently but are usually precombined in packages which can be obtained from suppliers of lubricant oil additives. Additive packages with a variety of ingredients, proportions and characteristics are available and selection of the appropriate package will take the requisite use of the ultimate composition into account.

The lube base stocks of the present disclosure are well suited as lube base stocks without blending limitations, and further, the lube base stock products are also compatible with lubricant additives for lubricant formulations. The lube base stocks of the present disclosure can optionally be blended with other lube base stocks to form lubricants. Useful cobase lube stocks include Group I, III, IV and V base stocks and gas-to-liquid (GTL) oils. One or more of the cobase stocks may be blended into a lubricant composition including the lube base stock at from 0.1 to 50 wt. %, or 0.5 to 40 wt. %, 1 to 35 wt. %, or 2 to 30 wt. %, or 5 to 25 wt. %, or 10 to 20 wt. %, based on the total lubricant composition.

The lube base stocks and lubricant compositions can be employed in the present disclosure in a variety of lubricant-related end uses, such as a lubricant oil or grease for a device or apparatus requiring lubrication of moving and/or interacting mechanical parts, components, or surfaces. Useful apparatuses include engines and machines. The lube base stocks of the present disclosure are most suitable for use in the formulation of automotive crank case lubricants, automotive gear oils, transmission oils, many industrial lubricants including circulation lubricant, industrial gear lubricants, grease, compressor oil, pump oils, refrigeration lubricants, hydraulic lubricants, metal working fluids.

CONFIGURATION EXAMPLES

Figure 2:
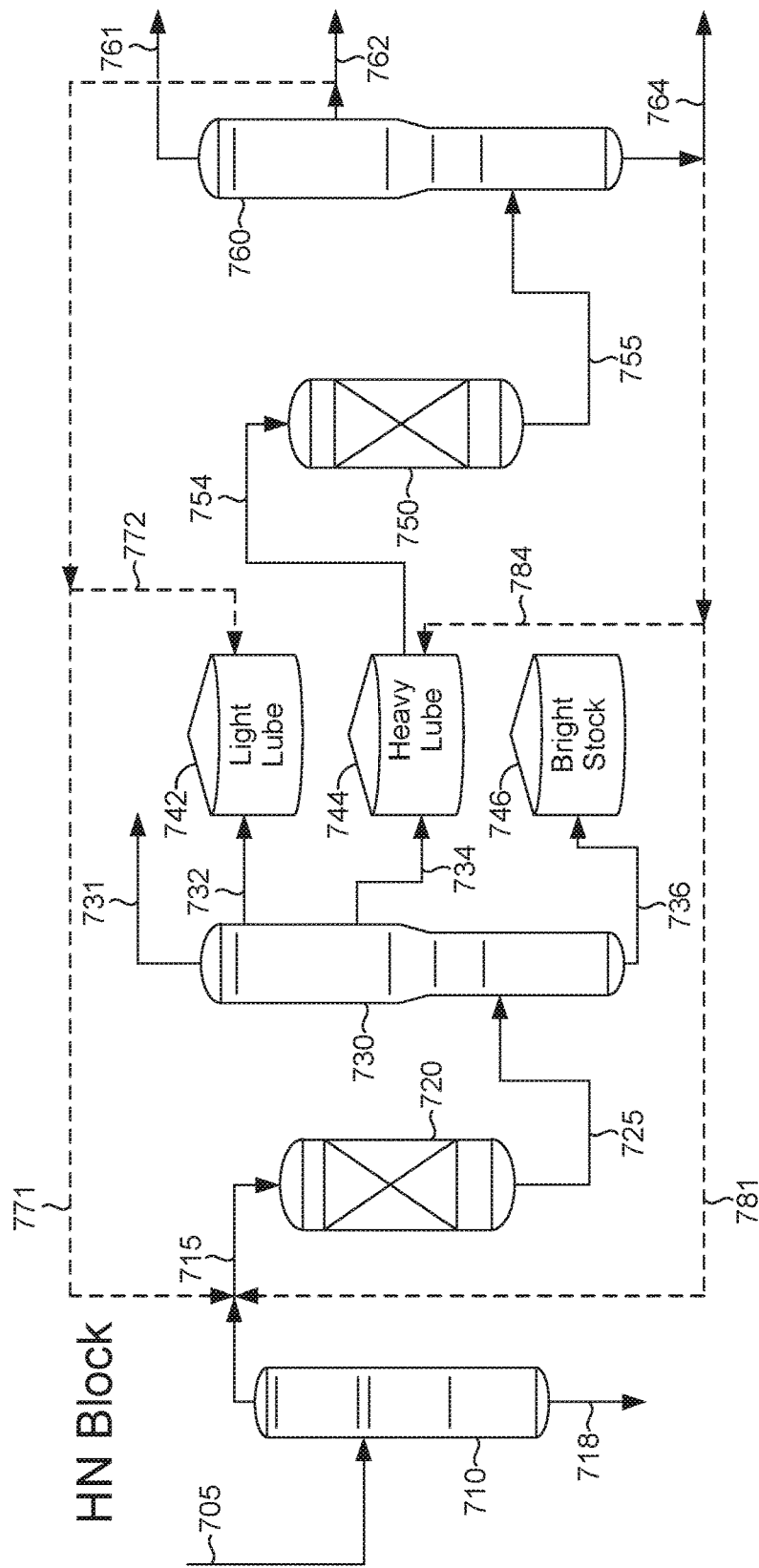
FIG. 2 schematically shows an example of a configuration for block catalytic processing of deasphalted oil to form lubricant base stocks.
Figure 3:
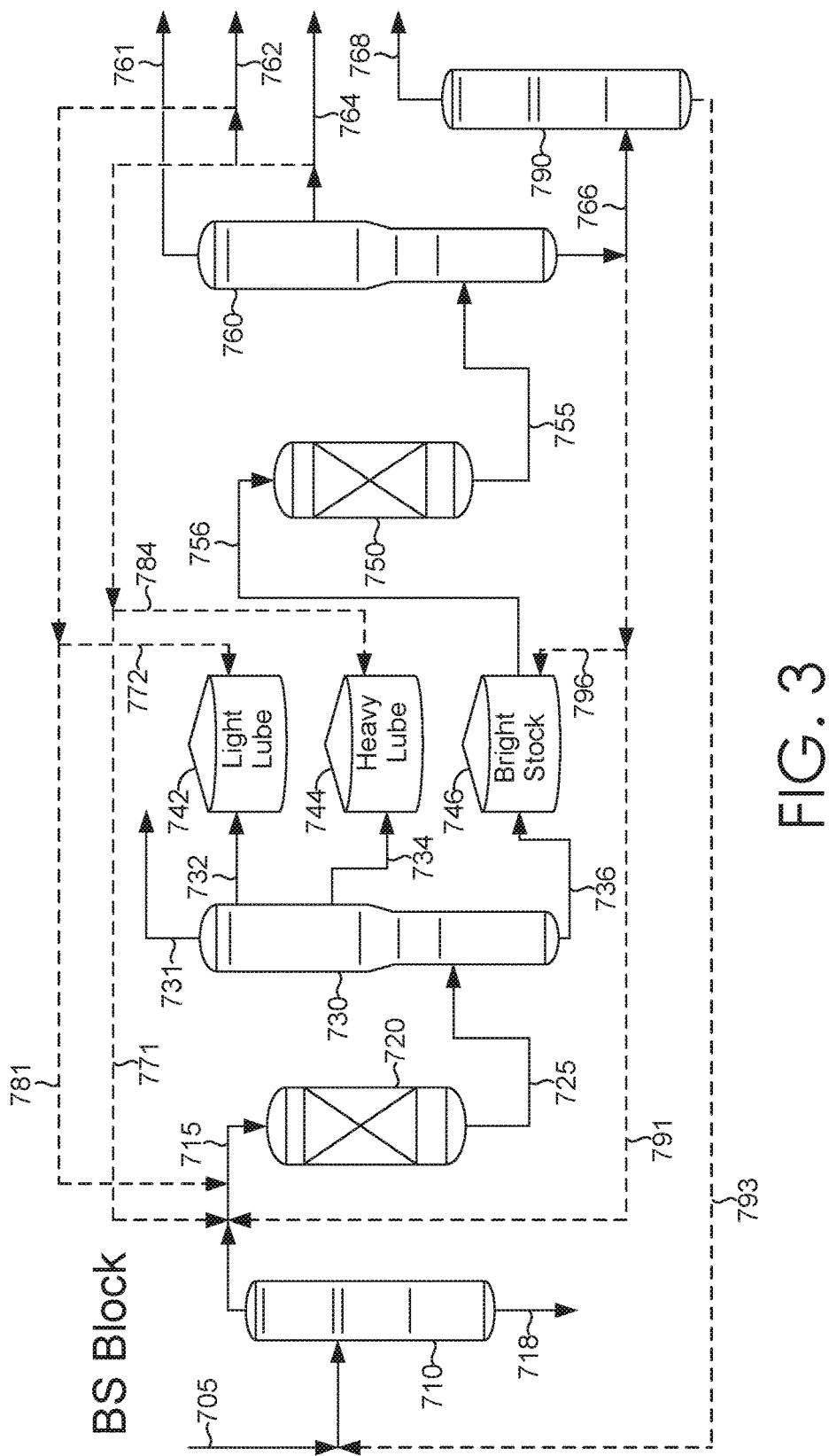
FIG. 3 schematically shows an example of a configuration for block catalytic processing of deasphalted oil to form lubricant base stocks.

FIGS. 1 to 3 show examples of using blocked operation and/or partial product recycle during lubricant production based on a feed including deasphalted resid. In FIGS. 1 to 3, after initial sour stage processing, the hydroprocessed effluent is fractionated to form light neutral, heavy neutral, and brightstock portions. FIG. 1 shows an example of the process flow during processing to form light neutral base stock. FIG. 2 shows an example of the process flow during processing to form heavy neutral base stock. FIG. 3 shows an example of the process flow during processing to form brightstock.

In FIG. 1, a feed 705 is introduced into a deasphalter 710. The deasphalter 710 generates a deasphalted oil 715 and deasphalter rock or residue 718. The deasphalted oil 715 is then processed in a sour processing stage 720. Optionally, a portion 771 of recycled light neutral base product 762 can be combined with deasphalted oil 715. Sour processing stage 720 can include one or more of a deasphalting catalyst, a hydrotreating catalyst, a hydrocracking catalyst, and/or an aromatic saturation catalyst. The conditions in sour processing stage 720 can be selected to at least reduce the sulfur content of the hydroprocessed effluent 725 to 20 wppm or less. This can correspond to 15 wt % to 40 wt % conversion of the feed relative to 370° C. Optionally, the amount of conversion in the sour processing stage 720 can be any convenient higher amount so long as the combined conversion in sour processing stage 720 and sweet processing stage 750 is 90 wt % or less.

The hydroprocessed effluent 725 can then be passed into fractionation stage 730 for separation into a plurality of fractions. In the example shown in FIG. 1, the hydroprocessed effluent is separated into a light neutral portion 732, a heavy neutral portion 734, and a brightstock portion 736. To allow for blocked operation, the light neutral portion 732 can be sent to corresponding light neutral storage 742, the heavy neutral portion 734 can be sent to corresponding heavy neutral storage 744, and the brightstock portion 736 can be sent to corresponding brightstock storage 746. A lower boiling range fraction 731 corresponding to fuels and/or light ends can also be generated by fractionation stage 730. Optionally, fractionation stage can generate a plurality of lower boiling range fractions 731.

FIG. 1 shows an example of the processing system during a light neutral processing block. In FIG. 1, the feed 752 to sweet processing stage 750 corresponds to a feed derived from light neutral storage 742. The sweet processing stage 750 can include at least dewaxing catalyst, and optionally can further include one or more of hydrocracking catalyst and aromatics saturation catalyst. The dewaxed effluent 755 from sweet processing stage 750 can then be passed into a fractionator 760 to form light neutral base stock product 762. A lower boiling fraction 761 corresponding to fuels and/or light ends can also be separated out by fractionator 760. Optionally, a portion of light neutral base stock 762 can be recycled. The recycled portion of light neutral base stock 762 can be used as a recycled feed portion 771 and/or as a recycled portion 772 that is added to light neutral storage 742. Recycling a portion 771 for use as part of the feed can be beneficial for increasing the lifetime of the catalysts in sour processing stage 720. Recycling a portion 772 to light neutral storage 742 can be beneficial for increasing conversion and/or VI.

FIG. 2 shows the same processing configuration during processing of a heavy neutral block. In FIG. 2, the feed 754 to sweet processing stage 750 is derived from heavy neutral storage 744. The dewaxed effluent 755 from sweet processing stage 750 can be fractionated 760 to form lower boiling portion 761, heavy neutral base stock product 764, and light neutral base stock product 762. Because block operation to form a heavy neutral base stock results in production of both a light neutral product 762 and a heavy neutral product 764, various optional recycle streams can also be used. In the example shown in FIG. 2, optional recycle portions 771 and 772 can be used for recycle of the light neutral product 762. Additionally, optional recycle portions 781 and 784 can be used for recycle of the heavy neutral product 764. Recycle portions 781 and 784 can provide similar benefits to those for recycle portions 771 and/or 772.

FIG. 3 shows the same processing configuration during processing of a bright stock block. In FIG. 3, the feed 756 to sweet processing stage 750 is derived from bright stock storage 746. The dewaxed effluent 755 from sweet processing stage 750 can be fractionated 760 to form lower boiling portion 761, bottoms product 766, heavy neutral base stock product 764, and light neutral base stock product 762. Bottoms product 766 can then be extracted 790 to form a bright stock product 768. The aromatic extract 793 produced in extractor 790 can be recycled for use, for example, as part of the feed to deasphalter 710.

Because block operation to form a bright stock results in production of a bright stock product 768 as well as a light neutral product 762 and a heavy neutral product 764, various optional recycle streams can also be used. In the example shown in FIG. 3, optional recycle portions 771 and 772 can be used for recycle of the light neutral product 762, while optional recycle portions 781 and 784 can be used for recycle of the heavy neutral product 764. Additionally, optional recycle portions 791 and 796 can be used for recycle of the bottoms product 766. Recycle portions 791 and 796 can provide similar benefits to those for recycle portions 771, 772, 781, and/or 784.

Example 1

In this example, a deasphalted oil was generated based on high lift deasphalting using a $C_5$ deasphalting solvent. The deasphalted oil was processed in a two-stage reaction system. In a first stage under sour conditions, the deasphalted oil was exposed to a demetallization catalyst, a hydrotreating catalyst, and a hydrocracking catalyst. The first stage effluent was then separated to remove fuels (and lower) boiling range fractions from a 370° C.+ portion of the first stage effluent.

The separation further provided for separation of the 370° C.+ portion into feeds for light neutral base stock production, heavy neutral base stock production, and bright stock production. The feeds derived from the 370° C.+ portion of the first stage effluent were then exposed to an aromatic saturation catalyst, a hydrocracking catalyst, a dewaxing catalyst, and another portion of the aromatic saturation catalyst in a second (sweet) reaction stage. The aromatic saturation catalyst was a commercially available aromatic saturation catalyst including Pt on a mixed metal oxide. The dewaxing catalyst was a catalyst that dewaxes primarily by isomerization, and also included supported Pt. The hydrocracking catalyst included Pt on a support including USY.

The second stage was operated under blocked operating conditions, to allow for selection of separate processing conditions for each of the types of 370° C.+ feeds (light neutral, heavy neutral, bright stock).

The deasphalted oil feed introduced into the first (sour) stage had a density at 15° C. of 0.9843 g/cm$^3$; an API gravity of 12.3; a hydrogen content of 10.76 wt %; a sulfur content of 3.5 wt %; a nitrogen content of 2562 wppm; a kinematic viscosity at 100° C. of 181 cSt; a viscosity index of 74; a T10 distillation point of 494° C.; and a T90 distillation point of 724° C.

The deasphalted oil was exposed to the catalysts in the sour stage under conditions sufficient for performing 48 wt % conversion on the feed relative to a temperature of 370° C. For the 370° C.+ portion of the effluent, 17 wt % (relative to the weight of the total effluent) corresponded to a feed for light neutral production having a kinematic viscosity at 100° C. of 5.4 cSt and a viscosity index of 117; 14 wt % corresponded to a feed for heavy neutral production having a kinematic viscosity at 100° C. of 11.1 cSt and a viscosity index of 114; and 21 wt % corresponded to a feed for bright stock production having a kinematic viscosity at 100° C. of 33.6 cSt and a viscosity index of 116. The sulfur content of the liquid portions of the sour stage effluent was 10 wppm or less. The sulfur content of each of the 370° C.+ fractions produced was also 10 wppm or less.

The 370° C.+ fractions were then further processed in the second (sweet) reaction stage. The bright stock feed was processed under two different sets of reaction conditions to form bright stock products from lower severity and higher severity processing.

Light Neutral Feed—The light neutral feed introduced into the second (sweet) stage had a density at 15° C. of 0.8128 g/cm$^3$; an API gravity of 31.9; a hydrogen content of 13.6 wt %; a sulfur content of less than 5 wppm; a nitrogen content of 3 wppm; a kinematic viscosity at 100° C. of 5.4 cSt; a viscosity index of 117; a T10 distillation point of 385° C.; and a T90 distillation point of 488° C.

The light neutral feed was exposed to the catalysts in the sweet stage under conditions sufficient for performing roughly 24 wt % conversion on the feed relative to a temperature of 370° C. After separation of fuels (and lower) boiling range components, roughly a 76 wt % yield of light neutral base stock was formed relative to a weight of the light neutral feed. A cut point of 378° C. was used for separating diesel fuel from the light neutral base stock in order to achieve a desired viscosity. The light neutral base stock had a T10 distillation point of 386° C.; a T90 distillation point of 492° C.; a kinematic viscosity at 100° C. of 5.7 cSt; a viscosity index of 110; a pour point of −22° C.; a cloud point of −20° C.; and an API gravity of 32.9. The saturates content was at least 99 wt %.

Heavy Neutral Feed—The heavy neutral feed introduced into the second (sweet) stage had a density at 15° C. of 0.819 g/cm$^3$; an API gravity of 31.1; a hydrogen content of 13.7 wt %; a sulfur content of less than 5 wppm; a nitrogen content of 3 wppm; a kinematic viscosity at 100° C. of 11.1 cSt; a viscosity index of 114; a T10 distillation point of 447° C.; and a T90 distillation point of 565° C.

The heavy neutral feed was exposed to the catalysts in the sweet stage under conditions sufficient for performing roughly 10 wt % conversion on the feed relative to a temperature of 370° C. After separation of fuels (and lower) boiling range components, roughly a 85 wt % yield of heavy neutral base stock was formed relative to a weight of the heavy neutral feed. A cut point of 418° C. was used for separating diesel fuel from the heavy neutral base stock in order to achieve a desired viscosity. It is noted that an additional light neutral base stock fraction could have been produced from a heavy portion of the diesel fuel cut. The heavy neutral base stock had a T10 distillation point of 452° C.; a T90 distillation point of 559° C.; a kinematic viscosity at 100° C. of 12.0 cSt; a viscosity index of 105; a pour point of −18° C.; a cloud point of -9° C.; and an API gravity of 31.3. The saturates content was at least 99 wt %.

Bright Stock Feed (Low Conversion)—In one example, the bright stock feed was processed under low conversion conditions in the second stage. The bright stock introduced into the second (sweet) stage had a density at 15° C. of 0.830 g/cm$^3$; an API gravity of 29.4; a hydrogen content of 13.7 wt %; a sulfur content of 9 wppm; a nitrogen content of 3 wppm; a micro carbon residue content of 0.02 wt %; a kinematic viscosity at 100° C. of 33.6 cSt; a viscosity index of 117; a T10 distillation point of 552° C.; and a T90 distillation point of 690° C.

The bright stock feed was exposed to the catalysts in the sweet stage under conditions sufficient for performing roughly 22 wt % conversion on the feed relative to a temperature of 370° C. After separation of fuels (and lower) boiling range components, roughly a 73 wt % yield of bright stock was formed relative to a weight of the bright stock feed. Additionally, 5.5 wt % of a light neutral base stock was formed. A cut point of 368° C. was used for separating diesel fuel from the additional light neutral base stock. The bright stock produced under the low conversion conditions had a T10 distillation point of 517° C.; a T90 distillation point of 681° C.; a kinematic viscosity at 100° C. of 32.0 cSt; a viscosity index of 102; a pour point of −32° C.; a cloud point of −33° C.; and an API gravity of 29.6. The saturates content was at least 99 wt %.

It is noted that the bright stock produced under low conversion conditions in the second stage demonstrated an unexpected property in the form of having a cloud point that was lower than the pour point. This type of unexpected reversal of the ordering of the cloud point and pour point for a bright stock could potentially be beneficial for low temperature applications where bright stock is desirable.

The additional light neutral base stock produced under the low conversion conditions had a T10 distillation point of 363° C.; a T90 distillation point of 486° C.; a kinematic viscosity at 100° C. of 5.3 cSt; a viscosity index of 100; a pour point of −58° C.; and an API gravity of 33.2. The saturates content was at least 98 wt %.

Bright Stock Feed (High Conversion)—In another example, the bright stock feed was processed under higher conversion conditions in the second stage. The bright stock introduced into the second (sweet) stage had a density at 15° C. of 0.830 g/cm$^3$; an API gravity of 29.4; a hydrogen content of 13.7 wt %; a sulfur content of 9 wppm; a nitrogen content of 3 wppm; a micro carbon residue content of 0.02 wt %; a kinematic viscosity at 100° C. of 33.6 cSt; a viscosity index of 117; a T10 distillation point of 552° C.; and a T90 distillation point of 690° C.

The bright stock feed was exposed to the catalysts in the sweet stage under conditions sufficient for performing roughly 44 wt % conversion on the feed relative to a temperature of 370° C. After separation of fuels (and lower) boiling range components, roughly a 47 wt % yield of bright stock was formed relative to a weight of the bright stock feed. Additionally, 4.1 wt % of a light neutral base stock was formed. A cut point of 416° C. was used for separating diesel fuel from the additional light neutral base stock. The bright stock produced under the low conversion conditions had a T10 distillation point of 518° C.; a T90 distillation point of 678° C.; a kinematic viscosity at 100° C. of 34.8 cSt; a viscosity index of 100; a pour point of −27° C.; a cloud point of −60° C.; and an API gravity of 29.6. The saturates content was at least 99 wt %. Based on the differences between the bright stock properties for a similar boiling range, it appears that increasing the conversion in the second stage allowed for production of a bright stock with a lower cloud point, a lower viscosity index, and a higher kinematic viscosity at 100° C.

The additional light neutral base stock produced under the high conversion conditions had a T10 distillation point of 382° C.; a T90 distillation point of 503° C.; a kinematic viscosity at 100° C. of 6.0 cSt; a viscosity index of 104; a pour point of lower than −50° C.; and an API gravity of 34.4. The saturates content was at least 98 wt %.

Example 2

A configuration similar to the configuration shown in FIGS. 1 to 3 was used to process a resid-type feed that substantially included 510° C.+ components. The configuration for this example did not include recycle products as part of the feed for the sour stage or for further sweet stage processing. The feed was initially deasphalted using n-pentane to produce 75 wt % deasphalted oil and 25 wt % deasphalter rock or residue. The resulting deasphalted oil had an API gravity of 12.3, a sulfur content of 3.46 wt %, a nitrogen content of 2760 wppm, and a micro carbon residue content of roughly 12 wt %. The deasphalted oil was then hydroprocessed in an initial sour hydroprocessing stage that included four catalyst beds. The first two catalyst beds (in a first reactor) corresponded to commercially available demetallization catalysts. The third catalyst bed (in a second reactor) corresponded to a mixture of hydrotreating catalysts, including 14 vol% of a bulk metal hydrotreating catalyst. The fourth catalyst bed included a commercially available hydrocracking catalyst. The effluent from each catalyst bed was cascaded to the next catalyst bed. The average reaction temperature across each catalyst bed was 378° C. for the first demetallization catalyst bed, 388° C. for the second demetallization catalyst bed, 389° C. for the hydrotreating catalyst bed, and 399° C. for the hydrocracking catalyst bed. The flow rate of the feed relative to the total volume of catalyst in the sour hydroprocessing stage was an LHSV of 0.16 $hr^{-1}$. The hydrogen partial pressure was 2500 psia (17.2 MPa-a) and the hydrogen treat gas flow rate was 8000 scf/b (~1420 $Nm^3/m^3$). Under these conditions, the hydroprocessing consumed roughly 2300 scf/b (~400 $Nm^3/m^3$). The conditions resulted in roughly 50 wt % conversion relative to 370° C.

After processing in the initial sour stage, a fractionator was used to separate the hydroprocessed effluent into various fractions. The fractions included light ends, at least one fuels fraction, a light neutral fraction, a heavy neutral fraction, and a brightstock fraction. Table 1 shows additional details regarding the hydroprocessed effluent from the initial sour stage.

TABLE 1

Hydroprocessed Effluent (Sour Stage)

| Product | Wt % (of total effluent) | Nitrogen content (wppm) | Solvent dewaxed VI |
|---|---|---|---|
| $H_2S$ | 3.7 | | |
| $NH_3$ | 0.3 | | |

TABLE 1-continued

Hydroprocessed Effluent (Sour Stage)

| Product | Wt % (of total effluent) | Nitrogen content (wppm) | Solvent dewaxed VI |
|---|---|---|---|
| $C_1$ | 0.4 | | |
| $C_2$ | 0.4 | | |
| $C_3$ | 0.7 | | |
| $C_4$ | 0.9 | | |
| $C_5$ | 1.3 | | |
| $C_6$ to 370° C. (fuels fraction) | 45.6 | | |
| Light Neutral | 15.5 | 2 | 104.2 |
| Heavy Neutral | 14.0 | 2 | 101.5 |
| Brightstock | 18.9 | 3 | 104.1 |

The light neutral, heavy neutral, and brightstock fractions from the initial sour hydroprocessing stage were then further hydroprocessed in the presence of a noble metal hydrocracking catalyst system (75 wt % of 0.6 wt % Pt on amorphous alumina/25 wt % of 0.6 wt % Pt on alumina bound zeolite Beta), a noble metal dewaxing catalyst (0.6 wt % Pt on alumina bound ZSM-48), and a noble metal hydrofinishing catalyst (0.6 wt % Pt on amorphous alumina). The sweet stage conditions for each fraction included a pressure of 2500 psig (17.2 MPag), a space velocity (LHSV) of 1.5 $hr^{-1}$ across each catalyst or catalyst system, and a hydrogen treat gas rate of 5000 SCF/b (~890 $Nm^3/m^3$). The temperatures across each catalyst or catalyst system were selected separately to achieve desired VI values for each type of feed fraction.

For the light neutral feed, the sweet stage temperatures were selected to achieve roughly 23 wt % conversion relative to 370° C. The average temperature across the first catalyst system was 530° F. (277° C.), the average temperature across the second catalyst was 592° F. (311° C.), and the average temperature across the third catalyst was 428° F. (220° C.). This produced a light neutral lubricant base stock in a 77.0 wt % yield relative to the light neutral feed. The resulting light neutral base stock had a VI of 107 and a kinematic viscosity at 100° C. of 5.6 cSt. For the heavy neutral feed, the sweet stage conditions were selected to achieve roughly 7 wt % conversion relative to 370° C. For heavy neutral processing, the average temperature across the first catalyst system was 550° F. (288° C.), the average temperature across the second catalyst was 599° F. (316° C.), and the average temperature across the third catalyst was 428° F. (220° C.). This produced a heavy neutral lubricant base stock in a 92.9 wt % yield relative to the heavy neutral feed. The resulting heavy neutral base stock had a VI of 104.9 and a kinematic viscosity at 100° C. of 11.5 cSt. Table 2 provides additional details regarding the light neutral and heavy neutral sweet stage blocking products.

TABLE 2

Light and Heavy Neutral Blocked Sweet Stage Products

| Product Property | Light Neutral | Heavy Neutral |
|---|---|---|
| VI | 107 | 104.9 |
| Pour Point (° C.) | −23 | −23 |
| Cloud Point (° C.) | −20 | −12 |
| KV @40° C. (cSt) | 32.17 | 98.14 |
| KV @100° C. (cSt) | 5.56 | 11.50 |
| Yields | | |
| $H_2$ | −0.36 | −0.39 |
| $C_1$-$C_4$ | 0.27 | 0.48 |

TABLE 2-continued

Light and Heavy Neutral Blocked Sweet Stage Products

| Product Property | Light Neutral | Heavy Neutral |
|---|---|---|
| $C_5$-163° C. | 1.62 | 1.56 |
| 163° C.-370° C. | 21.49 | 5.43 |
| Lube (LN or HN) | 76.98 | 92.92 |

The $H_2$ "yield" represents the amount of hydrogen consumed during sweet stage processing. As shown in Table 2, the viscosity index and pour point of the light neutral and heavy neutral products are similar. The aromatics content of the lube fractions was also characterized based on UV absorption. Table 3 shows the UV absorbance values in liters/g-cm for the light neutral and heavy neutral products.

TABLE 3

UV Absorbance of Light and Heavy Neutral Blocked Sweet Stage Products

| UV wavelength (nm) | Light Neutral | Heavy Neutral |
|---|---|---|
| 226 | 0.00 | 0.01 |
| 254 | 0.000 | 0.003 |
| 275 | 0.000 | 0.002 |
| 302 | 0.0001 | 0.0019 |
| 310 | 0.0001 | 0.0014 |
| 325 | 0.000 | 0.001 |
| 339 | 0.000 | 0.0009 |
| 400 | 0.00002 | 0.0005 |

As shown in Table 3, the light neutral product has little or no UV absorbance at any of the wavelengths investigated. The heavy neutral product does show some UV absorbance, potentially indicating the presence of low levels (less than 1.0 wt %) of aromatic compounds.

For the brightstock feed, two different sets of sweet stage temperatures were selected. In a first set of brightstock processing temperatures, the temperature across the first catalyst system was 520° F. (271° C.), the temperature across the second catalyst was 658° F. (348° C.), and the temperature across the third catalyst was 428° F. (220° C.). Table 4 shows the products from processing the blocked brightstock feed at the first set of brightstock processing temperatures. The resulting brightstock product was bright and clear upon inspection. It is noted that the resulting products were fractionated to also generate additional light neutral and heavy neutral portions. The yields for the light neutral and heavy neutral products can be combined with the various yields shown in the bright stock column to arrive at the total yield.

TABLE 4

Lower Severity Second Stage Brightstock Processing

| Product Property | Light Neutral | Heavy Neutral | Brightstock |
|---|---|---|---|
| VI | 93.1 | 92.3 | 103.3 |
| Pour Point (° C.) | −41 | −36 | −28 |
| Cloud Point (° C.) | | | <−33 |
| KV @40° C. (cSt) | 70.08 | 190.32 | 690.5 |
| KV @100° C. (cSt) | 8.62 | 16.75 | 41.74 |
| Saybolt | | +14 | |
| Turbidity | | 5.0 | |
| Yields | | | |

TABLE 4-continued

Lower Severity Second Stage Brightstock Processing

| Product Property | Light Neutral | Heavy Neutral | Brightstock |
|---|---|---|---|
| $H_2$ | | | −0.79 |
| $C_1$-$C_4$ | | | 6.45 |
| $C_5$-163° C. | | | 12.86 |
| 163° C.-370° C. | | | 11.71 |
| Lube Yields | 7.67 | 18.97 | 38.75 |

As shown in Table 4, the brightstock processing conditions generated a portion of a light neutral and/or heavy neutral product. Table 5 shows UV absorption characterization of the light neutral, heavy neutral, and brightstock products shown in Table 4. It is noted that the additional light neutral and/or heavy neutral product had a lower VI than the light neutral or heavy neutral produced from the block processing of the other lube feed fractions, but it was otherwise potentially suitable for use as a separate base stock product. Alternatively, the additional light neutral and/or heavy neutral products could be recycled to the light neutral or heavy neutral processing block. This could allow, for example, the light neutral or heavy neutral processing block to be operated at a reduced temperature (due to further reduced nitrogen in the combined feed). Such reduced temperature can be favorable for further reducing any additional aromatics that might be present in the recycled product. As still another option, the additional light neutral and/or heavy neutral product could be recycled to the initial sour stage for further upgrading, although this could lead to additional production of fuels as opposed to lubricant products.

TABLE 5

UV Absorbance of Lower Severity Brightstock Feed Sweet Stage Products

| UV wavelength (nm) | Light Neutral | Heavy Neutral | Brightstock |
|---|---|---|---|
| 226 | 0.02 | 0.01 | 0.01 |
| 254 | 0.07 | 0.003 | 0.01 |
| 275 | 0.007 | 0.002 | 0.001 |
| 302 | 0.0032 | 0.0013 | 0.0007 |
| 310 | 0.0027 | 0.001 | 0.0007 |
| 325 | 0.003 | 0.0007 | 0.0005 |
| 339 | 0.0034 | 0.0006 | 0.0004 |
| 400 | 0.00026 | 0.00021 | 0.00017 |

In a second set of brightstock processing temperatures, the temperature across the first catalyst system was 580° F. (304° C.), the temperature across the second catalyst was 658° F. (348° C.), and the temperature across the third catalyst was 428° F. (220° C.). Thus, in the second set of conditions, the primary difference was a higher temperature for across the hydrocracking catalyst system. Table 6 shows the products from processing the blocked brightstock feed at the first set of brightstock processing temperatures. The resulting brightstock product was bright and clear upon inspection. It is noted that the resulting products were fractionated to also generate additional light neutral and heavy neutral portions. The yields for the light neutral and heavy neutral products can be combined with the various yields shown in the bright stock column to arrive at the total yield.

TABLE 6

Higher Severity Second Stage Brightstock Processing

| Product Property | Light Neutral | Heavy Neutral | Brightstock |
|---|---|---|---|
| VI | 92.9 | 91.3 | 100.1 |
| Pour Point (° C.) | <−60 | <−45 | −24 |
| Cloud Point (° C.) | | | <−48 |
| KV @40° C. (cSt) | 32.42 | 119 | 549 |
| KV @100° C. (cSt) | 5.3 | 12.19 | 35.7 |
| Saybolt | | −4 | |
| Turbidity | | 1.3 | |
| Yields | | | |
| H$_2$ | | | −0.82 |
| C$_1$-C$_4$ | | | 6.41 |
| C$_5$-163° C. | | | 14.25 |
| 163° C.-370° C. | | | 12.07 |
| Lube Yields | 6.19 | 10.81 | 51.3 |

Table 7 shows UV absorption characterization of the light neutral, heavy neutral, and brightstock products shown in Table 6.

TABLE 7

UV Absorbance of Higher Severity Brightstock Feed Sweet Stage Products

| UV wavelength (nm) | Light Neutral | Heavy Neutral | Brightstock |
|---|---|---|---|
| 226 | 0.00 | 0.01 | 0.01 |
| 254 | 0.002 | 0.002 | 0.003 |
| 275 | 0.001 | 0.001 | 0.002 |
| 302 | 0.006 | 0.0008 | 0.0011 |
| 310 | 0.0005 | 0.0006 | 0.001 |
| 325 | 0.0003 | 0.0004 | 0.0007 |
| 339 | 0.0002 | 0.0003 | 0.0005 |
| 400 | 0.00008 | 0.00008 | 0.00018 |

Additional Embodiments

Embodiment 1. A base stock composition comprising a kinematic viscosity at 100° C. of 30 cSt or more (or 32 cSt or more), a pour point of −9° C. or less, and a cloud point that is lower than the pour point.

Embodiment 2. The composition of Embodiment 1, the composition further comprising 20 wt % or more naphthenes relative to a weight of the composition, or 40 wt % or more, or 60 wt % or more.

Embodiment 3. The composition of any of the above embodiments, wherein the composition further comprising a viscosity index of 80 or more (or 80 to 120); or wherein the composition further comprises a density at 15° C. of 0.90 g/cm$^3$ or less, or 0.89 g/cm$^3$ or less, or 0.88 g/cm$^3$ or less (or 0.84 to 0.90); or a combination thereof.

Embodiment 4. The composition of any of the above embodiments, wherein the pour point is −15° C. or less, or −20° C. or less; wherein the cloud point is −15° C. or less, or −20° C. or less; or a combination thereof.

Embodiment 5. The composition of any of the above embodiments, wherein the composition further comprises a turbidity of 5 NTUs or less, or 3 NTUs or less, or 2 NTUs or less; or wherein the composition is visually free of haze; or a combination thereof.

Embodiment 6. A lubricating oil comprising the composition of any of the above embodiments and a minor amount of one or more additives chosen from an antiwear additive, a viscosity modifier, an antioxidant, a detergent, a dispersant, a pour point depressant, a corrosion inhibitor, a metal deactivator, a seal compatibility additive, a demulsifying agent, an anti-foam agent, inhibitor, an anti-rust additive, and combinations thereof, the lubricating oil optionally comprising at least one of an engine oil, an industrial lubricating oil, and a marine lubricating oil.

Embodiment 7. A method for making lubricant base stock, comprising: performing solvent deasphalting using a C$_{4+}$ solvent under effective solvent deasphalting conditions on a feedstock having a T5 boiling point of at least about 370° C. (or at least about 400° C., or at least about 450° C., or at least about 500° C.), the effective solvent deasphalting conditions producing a yield of deasphalted oil of at least about 50 wt % of the feedstock; hydroprocessing at least a portion of the deasphalted oil under first effective hydroprocessing conditions comprising first hydrocracking conditions to form a hydroprocessed effluent, the at least a portion of the deasphalted oil having an aromatics content of at least about 50 wt %, the hydroprocessed effluent comprising a sulfur content of 300 wppm or less, a nitrogen content of 100 wppm or less, or a combination thereof; separating the hydroprocessed effluent to form at least a fuels boiling range fraction, a first fraction having a T$_5$ distillation point of at least 370° C., and a second fraction having a T$_5$ distillation point of at least 370° C., the second fraction having a higher kinematic viscosity at 100° C. than the first fraction; hydroprocessing at least a portion of the first fraction under second effective hydroprocessing conditions, the second effective hydroprocessing conditions comprising second aromatic saturation conditions and second catalytic dewaxing conditions, to form a first catalytically dewaxed effluent comprising a 370° C.+ portion having a first kinematic viscosity at 100° C., the at least a portion of the first fraction being exposed to the second aromatic saturation conditions prior to the second catalytic dewaxing conditions, the second aromatic saturation conditions optionally comprising exposing the at least a portion of the first fraction to an amorphous aromatic saturation catalyst; and hydroprocessing at least a portion of the second fraction under third effective hydroprocessing conditions, the third effective hydroprocessing conditions comprising third aromatic saturation conditions and third catalytic dewaxing conditions, to form a second catalytically dewaxed effluent comprising a 370° C.+ portion having a second kinematic viscosity at 100° C. that is greater than the first kinematic viscosity at 100° C., the at least a portion of the second fraction being exposed to the third aromatic saturation conditions prior to the third catalytic dewaxing conditions, wherein the second effective hydroprocessing conditions are different from the third effective hydroprocessing conditions.

Embodiment 8. The method of Embodiment 7, wherein the first hydroprocessing conditions further comprise first aromatic saturation conditions, the first aromatic saturation conditions comprising exposing the at least a portion of the deasphalted oil to a demetallization catalyst, the at least a portion of the deasphalted oil being exposed to the demetallization catalyst after exposing the at least a portion of the deasphalted oil to the hydrocracking catalyst.

Embodiment 9. The method of Embodiment 7 or 8, wherein the second effective hydroprocessing conditions and third effective hydroprocessing conditions are different based on a difference in at least one of a hydrocracking pressure, a hydrocracking temperature, a dewaxing pressure, and a dewaxing temperature.

Embodiment 10. A method for making lubricant base stock, comprising: performing solvent deasphalting using a C$_{4+}$ solvent under effective solvent deasphalting conditions on a feedstock having a T5 boiling point of at least about 370° C. (or at least about 400° C., or at least about 450° C., or at least about 500° C.), the effective solvent deasphalting conditions producing a yield of deasphalted oil of at least about 50 wt % of the feedstock; hydroprocessing at least a portion of the deasphalted oil under first effective hydroprocessing conditions comprising first hydrocracking conditions to form a hydroprocessed effluent, the at least a portion of the deasphalted oil having an aromatics content of at least about 50 wt %; separating the hydroprocessed effluent to form at least a fuels boiling range fraction, a first fraction having a $T_5$ distillation point of at least 370° C., and a second fraction having a $T_5$ distillation point of at least 370° C., the second fraction having a higher kinematic viscosity at 100° C. than the first fraction; hydroprocessing at least a portion of the first fraction under second effective hydroprocessing conditions, the second effective hydroprocessing conditions comprising exposing the first fraction to a medium pore dewaxing catalyst to form a first catalytically dewaxed effluent comprising a 370° C.+ portion having a first kinematic viscosity at 100° C.; and hydroprocessing at least a portion of the second fraction under third effective hydroprocessing conditions, the third effective hydroprocessing conditions comprising exposing the second fraction to the medium pore dewaxing catalyst to form a second catalytically dewaxed effluent comprising a 370° C.+ portion having a second kinematic viscosity at 100° C. that is greater than the first kinematic viscosity at 100° C., wherein the second effective hydroprocessing conditions are different from the third effective hydroprocessing conditions.

Embodiment 11. The method of Embodiment 10, wherein the medium pore dewaxing catalyst comprises ZSM-5; wherein the medium pore dewaxing catalyst comprises 0.05 wt % or less of Group VIII metals; wherein the at least a portion of the deasphalted oil comprises a sulfur content of 300 wppm or more; or a combination thereof.

Embodiment 12. The method of any of Embodiments 7-11, wherein at least a portion of the first fraction, at least a portion of the second fraction, at least a portion of the first catalytically dewaxed effluent, at least a portion of the second catalytically dewaxed effluent, or a combination thereof is used as a feed for a steam cracker; or wherein at least a portion of the second catalytically dewaxed effluent is used as an asphalt blend component; or a combination thereof.

Embodiment 13. The method of any of Embodiments 7-12, wherein separating the hydroprocessed effluent further comprises forming an additional fraction having a $T_5$ distillation point of at least 370° C., the method further comprising: hydroprocessing at least a portion of the additional fraction under third effective hydroprocessing conditions, the third effective hydroprocessing conditions comprising catalytic dewaxing conditions, to form a third catalytically dewaxed effluent comprising a 370° C.+ portion having a kinematic viscosity at 100° C. of 3.5 cSt or more.

Embodiment 14. The method of any of Embodiments 7-13, wherein the hydroprocessing at least a portion of the first fraction and the hydroprocessing at least a portion of the second fraction comprise block operation of a processing system.

Embodiment 15. The method of any of Embodiments 7-14, further comprising recycling at least a portion of the second catalytically dewaxed effluent as part of the at least a portion of the deasphalted oil, as part of the at least a portion of the first fraction, or a combination thereof.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The present invention has been described above with reference to numerous embodiments and specific examples. Many variations will suggest themselves to those skilled in this art in light of the above detailed description. All such obvious variations are within the full intended scope of the appended claims.

The invention claimed is:

1. A base stock composition comprising a Group II base stock having at least 20 wt% or more naphthenes and wherein the Group II base stock has a kinematic viscosity at 100° C. of 30 cSt or more, a pour point of −9° C. or less, and a cloud point that is lower than the pour point.

2. The composition of claim 1, the composition further comprising a viscosity index of 103 or more.

3. The composition of claim 1, the composition further comprising a density at 15° C. of 0.90 g/cm$^3$ or less.

4. The composition of claim 1, wherein the pour point is −15° C. or less.

5. The composition of claim 1, wherein the cloud point is −20° C. or less.

6. The composition of claim 1, the composition further comprising a turbidity of 5 NTUs or less.

7. The composition of claim 1, wherein the composition is visually free of haze.

8. A lubricating oil comprising the composition of claim 1 and a minor amount of one or more additives chosen from an antiwear additive, a viscosity modifier, an antioxidant, a detergent, a dispersant, a pour point depressant, a corrosion inhibitor, a metal deactivator, a seal compatibility additive, a demulsifying agent, an anti-foam agent, inhibitor, an anti-rust additive, and combinations thereof.

9. The lubricating oil of claim 8, wherein the lubricating oil is an engine oil, an industrial lubricating oil, or a marine lubricating oil.

* * * * *